United States Patent
Saurabh et al.

(10) Patent No.: US 10,255,403 B1
(45) Date of Patent: Apr. 9, 2019

(54) METHOD AND APPARATUS FOR CONCURRENTLY EXTRACTING AND VALIDATING TIMING MODELS FOR DIFFERENT VIEWS IN MULTI-MODE MULTI-CORNER DESIGNS

(71) Applicant: CADENCE DESIGN SYSTEMS, INC., San Jose, CA (US)

(72) Inventors: Sneh Saurabh, Uttar Pradesh (IN); Naresh Kumar, Uttar Pradesh (IN)

(73) Assignee: Cadence Design Systems, Inc., San Jose, CA (US)

( * ) Notice: Subject to any disclaimer, the term of this patent is extended or adjusted under 35 U.S.C. 154(b) by 670 days.

(21) Appl. No.: 14/988,808

(22) Filed: Jan. 6, 2016

(51) Int. Cl.
*G06F 17/50* (2006.01)

(52) U.S. Cl.
CPC ...... *G06F 17/5081* (2013.01); *G06F 17/5045* (2013.01)

(58) Field of Classification Search
CPC .......................... G06F 17/5045; G06F 17/5081
USPC .......................................................... 716/113
See application file for complete search history.

(56) References Cited

U.S. PATENT DOCUMENTS

| | | | | |
|---|---|---|---|---|
| 7,739,098 B2* | 6/2010 | Kucukcakar | ........ | G06F 17/5031 702/125 |
| 8,239,798 B1* | 8/2012 | Goyal | ................. | G06F 17/5031 716/113 |
| 8,341,573 B2* | 12/2012 | Rao | ...................... | G06F 17/5031 703/19 |
| 8,863,052 B1* | 10/2014 | Dhuria | ................ | G06F 17/5036 716/108 |
| 2007/0094626 A1* | 4/2007 | Alter | .................... | G06F 17/5031 716/108 |
| 2012/0324410 A1* | 12/2012 | Sripada | ............... | G06F 17/5031 716/113 |
| 2017/0011161 A1* | 1/2017 | Liao | ..................... | G06F 17/5031 |

* cited by examiner

*Primary Examiner* — Phallaka Kik
*Assistant Examiner* — Brandon Bowers
(74) *Attorney, Agent, or Firm* — Rosenberg, Klein & Lee

(57) ABSTRACT

A view definition analyzer maps a plurality of timing views for a circuit design into compatibility groups having shared operating conditions of their respective process corners. An ETM generator then extracts an extracted timing model from a block of the circuit design for each compatibility group, containing timing arcs representing each combination of interface path in the circuit block and timing view in the compatibility group, where at least one timing arc in the ETM is a merged version of multiple timing arcs for an interface path across multiple timing views in the compatibility group. Timing arcs are merged when each timing characteristic in a first timing arc matches, within a tolerance threshold, a corresponding timing characteristic in a second timing arc. The ETM may then be used to model any timing view in the compatibility group. The ETM generator thus produces a minimal set of extracted timing models.

20 Claims, 10 Drawing Sheets

METHOD AND APPARATUS FOR CONCURRENTLY EXTRACTING AND VALIDATING TIMING MODELS FOR DIFFERENT VIEWS IN MULTI-MODE MULTI-CORNER DESIGNS

BACKGROUND OF THE INVENTION

The subject system and method are generally directed to removing redundancy in a set of timing models of a circuit design. In particular, although not exclusively, a set of timing views for a circuit design is organized into a set of compatibility groups, based on whether process corners are shared between the timing views, and one extracted timing model is generated for each compatibility group.

With the increase in the size of circuit designs, divide-and-conquer methodologies, executed using hierarchical design implementation and sign-off, have become the preferred design approach. One of the extensively employed methodologies for hierarchical design implementation is based on the Extracted Timing Model (ETM). An ETM encapsulates the timing information of the interface-paths of a given block, often although not necessarily in Synopsys Liberty Format (.lib format). The ETMs of different blocks of a design are extracted and plugged-in at the top-level for performing top-level timing analysis. The ETM-based methodology is widely used both for design implementation and timing sign-off.

However, at advanced technology nodes the process-induced variations tend to have large impact on the electrical characteristics of switching devices, as well as on the behavior of interconnects. As a result, Process-Voltage-Temperature (PVT) variations at the gate and interconnect levels, as well as the number of functional and test modes (that is, analysis modes), have dramatically increased the number of requisite "timing views" to cover all mode-corner combinations. In general, for a given block the interface-level timing for different timing views are different. Therefore, for a given design, ETMs are typically extracted separately for each different timing view for each different block.

The runtime of generating ETMs for all the views using the above methodology is proportional to the number of timing views. With the number of timing views reaching into the hundreds in advanced processes, this methodology becomes inefficient and creates a significant hit in timing closure flows. Additionally, computationally intensive operations arising due to advanced delay models, waveform computation/propagation, SI-effects, glitch-analysis, etc. make the runtime of model-extraction for a single timing view significantly high. As a result, generating ETMs multiple times using the above methodology becomes unacceptable for advanced process designs. Specific issues include:

a. For each timing view, a new timing graph needs to be built. This incurs a heavy runtime penalty.

b. For each timing view, interface paths are enumerated separately, even though much of the information, such as information regarding the topology of the design, might be shared among different timing views.

c. For each timing view, delay calculations for various stages are done separately, even though many of the computations are similar for different timing views, and may be shared.

d. Validating and handing-off with so many ETMs is unduly manual, error prone, and problematic. The user needs to keep track of the corners, modes and associated view for each generated ETM and needs to appropriately plug them in for top-level timing analysis.

Therefore, there is a need for a robust, efficient, automated yet reliable ETM-based method and system for multiple-mode multiple-corner (MMMC) designs.

SUMMARY OF THE INVENTION

It is an object of the disclosed system and method to concurrently generate and validate ETMs and associated information for relevant views in an MMMC design. It is an object of the disclosed system and method to quickly, efficiently, and concurrently extract ETMs for multiple views. It is an object of the disclosed system and method to require minimal user intervention and tackle the problems of existing ETM-based methodology described above.

While not limited thereto, a disclosed embodiment is directed to a method of extracting a minimal set of extracted timing models (ETMs) for a plurality of timing views from a block of a circuit design operable in a plurality of analysis modes under a plurality of corners. The method preferably includes defining the plurality of timing views, each timing view representing a combination of at least one of a plurality of analysis modes with at least one of a plurality of corners, each corner defining a predetermined set of operating conditions; executing a processor to selectively map, based at least on a compatibility test, the plurality of timing views to a plurality of compatibility groups, each of the plurality of timing views being mapped to at least one compatibility group; and for each compatibility group, executing a processor to extract an extracted timing model (ETM) of the circuit block for timing views mapped to said compatibility group.

In certain embodiments of the disclosed method, the compatibility test may include a comparison of the corners of at least a first and second timing view, and the compatibility test may determine whether a new timing view is compatible with another timing view mapped in an existing compatibility group In certain embodiments of the disclosed method, the selective mapping may include, for each of the plurality of timing views, determining whether the timing view is compatible with an existing compatibility group according to the compatibility test, if the timing view is determined to be compatible with an existing compatibility group, mapping the timing view to the existing compatibility group, and if the timing view is determined not to be compatible with any existing compatibility group, generating a new compatibility group using the timing view. A compatibility group may be generated using a timing view by defining the timing view as a master view of the compatibility group and adding the timing view to a list of compatible views of the compatibility group, and a timing view may be mapped to a compatibility group by adding the timing view to the list of compatible views of the compatibility group.

In certain embodiments of the disclosed method, the compatibility test may determine that a first timing view is compatible with a second timing view if each operating condition of the corner of the first timing view is the same as a corresponding operating condition of the corner of the second timing view, and may determine that a timing view is compatible with a compatibility group if said timing view is compatible with a timing view already mapped to the compatibility group. The operating conditions of the corner of each view may include a voltage value, a temperature value, an operating process, and/or a power/ground state.

In certain embodiments of the disclosed method, if the analysis mode of a timing view mapped to a compatibility group has a source clock differing from the source clock of the analysis mode of the master timing view of the compatibility group, an assertion set may be generated including a reset-clock instruction.

In certain embodiments of the disclosed method, the extraction of the ETM includes a path enumeration of the circuit block.

In certain embodiments of the disclosed method, the extraction of the ETM for the compatibility group may include merging a plurality of ETM arcs. Each of the plurality of ETM arcs may be associated with a timing view mapped to the compatibility group, and include at least one timing characteristic. The merging of the plurality of ETM arcs may include: for each of the at least one timing characteristic of a first ETM arc, comparing the timing characteristic with a corresponding timing characteristic of a second ETM arc, and, if each of the at least one timing characteristic of the first ETM arc matches the corresponding timing characteristic of the second ETM arc within a tolerance threshold, generating a merged ETM arc.

While not limited thereto, another disclosed embodiment is directed to a concurrent extracted timing model (ETM) generation system for generating models for a plurality of timing views from a block of a circuit design operable in a plurality of analysis modes under a plurality of corners. The system preferably includes a view definition analyzer configured to define a plurality of timing views, of timing views, each timing view representing a combination of at least one of a plurality of analysis modes with at least one of a plurality of corners, each corner defining a predetermined set of operating conditions; and to selectively map, based at least on a compatibility test, the plurality of timing views to a plurality of compatibility groups, each of the plurality of timing views being mapped to at least one compatibility group. The system preferably also includes an ETM generator configured to extract an ETM for each compatibility group, the ETM modeling the circuit block for timing views mapped to said compatibility group.

In certain embodiments of the disclosed system, the ETM generator may include a concurrent path enumerator (CPE) configured to enumerate a plurality of timing paths from a block of a circuit design, each enumerated path being a worst-case timing path for an interface path in the circuit block; a concurrent path characterizer (CPC) configured to compute timing characteristics of a timing path and to join one or more characterized timing paths into an ETM arc, the timing characteristics of a timing path including an input slew and an output load, the ETM arc including an output delay value computed from input slews and output loads of the joined paths; a concurrent ETM-arcs manager (CEAM) configured to merge a plurality of ETM arcs into a merged ETM arc, each plurality of compatible ETM arcs corresponding to a subset of all timing views mapped to a compatibility group; and a model writer configured to generate an ETM from each merged ETM arc.

While not limited thereto, yet another disclosed embodiment is directed to a method of optimizing a static timing analysis (STA) process of a circuit design operable in a plurality of analysis modes under a plurality of corners. The method may include defining the plurality of timing views, each timing view representing a combination of at least one of a plurality of analysis modes with at least one of a plurality of corners, each corner defining a predetermined set of operating conditions; executing a processor to selectively map, based at least on a compatibility test, the plurality of timing views to a plurality of compatibility groups, each of the plurality of timing views being mapped to at least one compatibility group; for each compatibility group, executing a processor to extract an extracted timing model (ETM) of the circuit block for timing views mapped to said compatibility group; and executing a processor to perform at least one static timing analysis on the circuit design for all timing views mapped to a selected compatibility group by instantiating the ETM of the selected compatibility group in place of the circuit block in an analyzed circuit model.

Additional aspects, details, and advantages of the disclosed system and method will be set forth, in part, in the description and figures which follow.

DETAILED DESCRIPTION OF THE PREFERRED EMBODIMENTS

Figure 1:
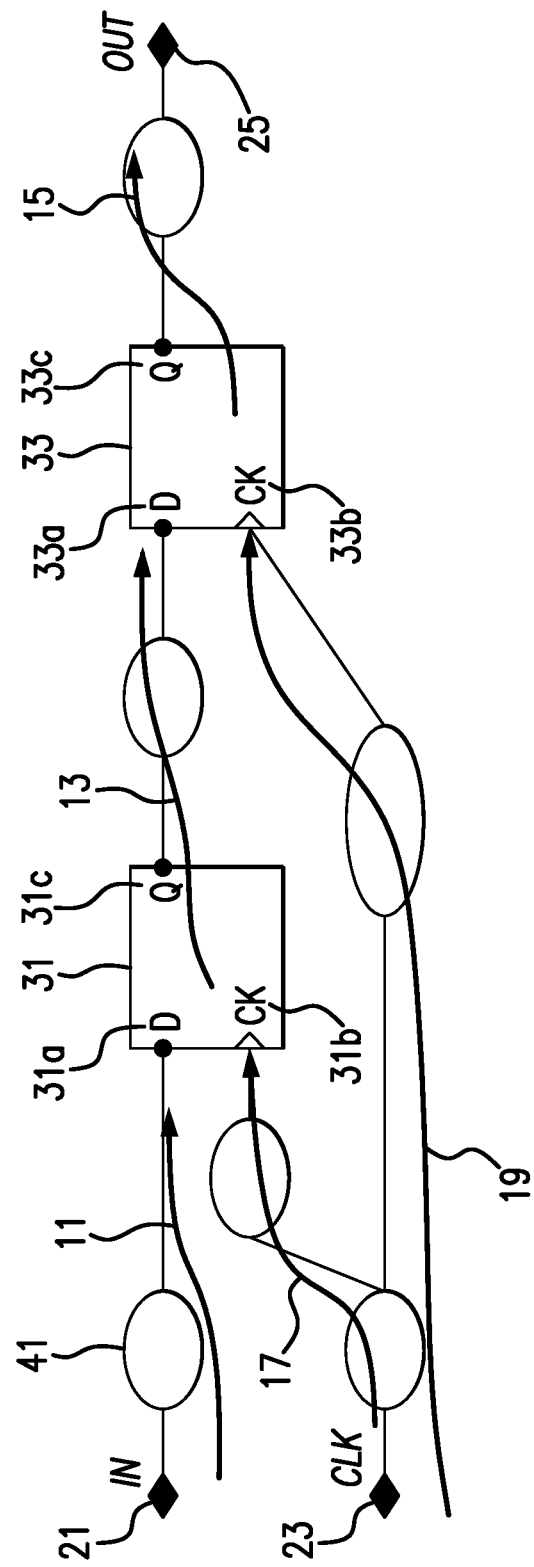
FIG. 1 is a block diagram illustrating an example circuit block and the paths within it.

Reference will now be made in detail to exemplary embodiments, which are illustrated in the accompanying drawings, wherein like reference numerals refer to the like elements throughout. The embodiments are described below in order to explain the disclosed system and method by referring to the figures.

Section headings are included in this Detailed Description. It is noted that these section headings are for convenience only and should not be interpreted as limiting the scope of the claimed invention in any way.

1. Background Concepts and Terminology

Static timing analysis (STA) is a methodology, well-known in the art, to assess the timing of any given digital circuit using software techniques and certain models that provide relevant characteristics of the digital circuit. At the highest level of analysis, STA considers the timing of a signal over all possible paths through the circuit to confirm that said timing is within acceptable speed requirements, and in some cases determine whether synchronization measures such as holds are needed. STA is conducted by breaking down the design into timing paths, calculating a delay of each path, and comparing the delays to the speed requirements.

At least some of the systems and techniques disclosed herein are applicable to other forms of circuit analysis, such as gate level simulation, with appropriate alteration. For convenience and brevity of illustration, however, these disclosures will generally assume a static timing analysis.

Many principles of static timing analysis are described in U.S. Pat. No. 8,938,703, issued on Jan. 20, 2015. Certain concepts and terms relevant to the present invention will now be described.

A digital circuit design may be divided into circuit blocks which may be analyzed and modeled individually, and the model substituted for the actual block in the circuit design for analysis purposes. The circuit block may include capturing and launching flip-flops which are used, respectively, to capture a data signal entering the block and launch a data signal exiting the block, for testing purposes.

FIG. 1 is a diagram illustrating paths through a simple example circuit block. The example circuit block includes an input port 21 receiving input from outside the circuit block which is fed to a data pin (D-pin) 31a of a capturing flip-flop 31. An output pin (Q-pin) 31c of the capturing flip-flop 31 passes output to a data pin 33a of a launching flip-flop 33. An output pin 33c of the launching flip-flop 33 passes output to an output port 25 of the circuit block, and from there out of the circuit block. Additionally, a clock source 23 provides a clock signal to a clock pin (CK-pin) 31b of the capturing flip-flop 31 and a clock pin 33b of the launching flip-flop 33. Other suitable logic may be also implemented in the regions of the example circuit block represented by ellipses, such as logic 41. Note that in practice a circuit block may have any suitable number of input, output, and clock ports, and any suitable number of capturing and launching flip-flops, depending on the requirements of a particularly intended application.

In the illustrated example circuit block, data paths include an input data path 11 from the input port 21 to the data pin 31a of the capturing flip-flop 31, an output data path 15 from the clock pin 33b of the launching flip-flop 33, and an internal data path 13 from the clock pin 31b of the capturing flip-flop 31 to the data pin 33a of the launching flip-flop 33.

Interface paths of a given circuit block encompass paths that pass through some input port or output port of the given block. These paths may be captured or launched by some other block or the top level of the entire circuit. Interface paths may be input port to flip-flop (such as data path 11), flip-flop to output port (such as data path 15), or input port to output port. It is noted that paths from a flip-flop to another flip-flop within the given block do not represent interface paths, as they do not enter or exit the circuit block. Therefore, in the example circuit block of FIG. 1, data path 13 is not an interface path.

Clock paths encompass paths starting from the pins that act as clock sources. For instance, in the example circuit block of FIG. 1, clock paths 17 and 19 begin at clock source 23, with clock path 17 ending at clock pin 31b of capturing flip-flop 31 and clock path 19 ending at clock pin 33b of launching flip-flop 33. A clock path that extends from a clock source to the clock-pin of the flip-flop where a data path starts serves as the launch clock path for that data path, while a clock path that extends from a clock source to the clock-pin of the flip-flop where the data path ends serves as the capture clock path for that data path. It is noted that a clock path may serve both tasks: in the example circuit block of FIG. 1, clock path 17 serves as the capture clock path for data path 11 and the launch clock path for data path 13, while clock path 19 serves as the capture clock path for data path 13 and the launch clock path for data path 15. When modeling the circuit block for analysis, the clock sources are defined by the user as linked to some pins of the design, along with other clock attributes like clock period and duty cycle. Models of the clock sources, with attributes, may be either generated or defined in the model or constraint-definition file; both types of models are referred to as "generated clocks."

A timing path may be represented by a sequence of pins. The timing path defined by n pins can be represented as $P_{1 \to n} = \{p1, p2, \ldots, pk, \ldots, pl, \ldots, pm, \ldots, pn\}$. The pin p1 represents the input or source pin and the pin pn represents the output or sink pin of the path. For instance, in the example circuit block of FIG. 1, input pin 21 represents the source pin of any timing path along interface path 11 (through logic 41), and data pin 31a represents the sink pin of any such timing path. Logic 41 itself may have any suitable number of additional pins between the source and sink. It is noted that two timing paths $P_{1 \to m}$ and $P_{m \to n}$ may be combined into a larger timing path $P_{1 \to n}$, when the same intermediate pin pm represents the sink pin of the first path and the source pin of the second.

A timing arc is a data structure representation of a timing path between two pins pi and pj and characteristics thereof. It is denoted as $Arc_{pi \to pj}$ and includes the following attributes representing characteristics of the timing path:

1. source=pi: represents the source pin of the arc
2. sink=pj: represents the sink pin of the arc
3. $trans_{pi}$: represents the transition at the source pin pi. It can be either rise or fall.
4. $trans_{pj}$: represents the transition at the sink pin pj. It can be either rise or fall.
5. INSLEW $Arc_{pi \to pj}$: represents the set of stews at the source pin pi. The kth slew in the timing arc is represented as INSLEW($Arc_{pi \to pj}$)[k].
6. LOAD $Arc_{pi \to pj}$: represents the set of loads at the sink pin pj. The kth load in the arc is represented as LOAD($Arc_{pi \to pj}$)[k].
7. OUTSLEW $Arc_{pi \to pj}$: represents the set of output-stews at the pin pj corresponding to each combination of input-slew at pi and the load at pin pj. The output-slew corresponding to the kth input-slew and the lth load is represented as OUTSLEW($Arc_{pi \to pj}$)[k][l]. If the number of elements in INSLEW($Arc_{pi \to pj}$) is N and the number of elements in LOAD($Arc_{pi \to pj}$) is M, then the number of elements in OUTSLEW($Arc_{pi \to pj}$) is N×M.
8. DELAY $Arc_{pi \to pj}$: represents the set of delays from the pin pi to the pin pj corresponding to each combination of the slew at pi and the load at pin pj. The delay corresponding to the kth input-slew and the lth load is represented as DELAY ($Arc_{pi \to pj}$)[k][l]. If the number of elements in INSLEW ($Arc_{pi \to pj}$) is N and the number of elements in LOAD ($Arc_{pi \to pj}$) is M, then the number of elements in DELAY ($Arc_{pi \to pj}$) is N×M.

A timing arc and its attributes may be represented as follows: $Arc_{pi \to pj} = (pi, pj, trans_{pi}, trans_{pj}, INSLEW\ Arc_{pi \to pj}, LOAD\ Arc_{pi \to pj}, OUTSLEW\ Arc_{pi \to pj}, DELAY\ Arc_{pi \to pj})$. In this notation, it is assumed that the OUTSLEW $Arc_{pi \to pj}$ and DELAY $Arc_{pi \to pj}$ has been computed for the given $\{pi, pj, trans_{pi}, trans_{pj}, INSLEW\ Arc_{pi \to pj}, LOAD\ Arc_{pi \to pj}\}$. These attributes may be computed by a suitable delay calculation engine or the like, which are known in the art and for reasons of brevity will not be described here.

Any data path may be modeled as a timing arc, including interface paths and clock paths. Preferably, when an interface path begins or ends at a flip-flop, it is modeled together with the clock path supplying a clock signal to that flip-flop. For instance, in the example circuit block of FIG. 1, interface path 15 begins at flip-flop 33 and is therefore modeled with clock path 19, which supplies the clock signal to the clock pin 33b of flip-flop 33. Likewise, interface path 11 ends at flip-flop 31 and is therefore modeled with clock path 17, which supplies the clock signal to the clock pin 31b of flip-flop 31.

An extracted timing model (ETM) is a modeled representation of the timing of the interface paths of a given block. An ETM is typically modeled in Synopsys Liberty Library (.lib) format or other such suitable format known in the art. The purpose of the representation of the timing of the given block is to retain only that information of the given block which may have an impact on the timing paths of the other blocks or the timing paths at the top. Therefore, the ETM does not capture, for example, the timing of the paths between two flip-flops in the given block, since these paths are fully contained inside the given block. Rather, ETMs typically replace the interface logic, such as logic 41 of interface path 11, of a circuit block with context-independent timing relationships between the pins. The ETM is extracted such that when the ETM is instantiated in a top level simulation for testing and analysis, the timing of the interface paths should be the same as if the given block was instantiated instead of the ETM. ETMs are important in the digital implementation and the sign-off flow, since the compact representation of the timing of the given block in the ETM saves runtime and memory requirements for the analysis at the top-level. ETMs also help in IP re-use, concurrent design development of different blocks, and hiding of a given block's details.

It is noted that there may be numerous different timing paths starting at a source pin p1 and concluding at a sink pin pn, each with their own timing characteristics and timing arc. As STA is generally focused on determining a floor of the speed of the circuit, rather than consider all such timing paths, it is preferable for an ETM to consider only a worst-case timing path for each interface path: that is, the timing path requiring the most time for a signal from the pin at the start of an interface path to the pin at the end. The resulting analysis then provides the worst-case timing for the circuit block while allowing a more compact ETM. Any suitable process known in the art may be employed to identify such worst-case timing path. Hereinafter, when the timing or timing arc of a data path or interface path is described, it is assumed, unless otherwise stated, that the worst-case timing path from the start to the end of the data path or interface path is the specific timing path being considered. For instance, the timing of interface path 11 in the example circuit block of FIG. 1 preferably represents the timing of the worst-case timing path from input port 21 to data pin 31a, regardless of other timing paths available through the logic 41 therebetween.

Typically in the art, an ETM will represent a circuit block, and will contain one timing arc representing each interface path (and, preferably, corresponding clock path) in said circuit block.

Process corners represent the extremes of the parameter variations within which a fabricated design is expected to operate. A corner is defined by a set of libraries (preferably in the .lib format) and a set of files containing the information of the parasitic resistance/capacitance (RC) of the design (preferably in the Standard Parasitic Exchange Format, or SPEF). A corner models a particular operating condition or conditions of variability expected in the design, and represents a particular process, voltage, or temperature (PVT) of the design, or combinations thereof. In some cases, a power/ground state of the design may also be relevant and may be represented in some or all corners. The timing characteristics of the timing paths of a block may vary depending on the corner applied.

An analysis mode is defined by a set of constraints, preferably stored in a constraint-definition file. A mode specifies a design environment and represents a particular state of the design for which analysis is being carried out, for example: functional mode, test mode, best-case/worst-case mode, on-chip variation mode, etc. An analysis mode might define constraints such as but not limited to early or late clock timing, maximum or minimum delay, best or worst case operation, or early, late, or no derating, on any of the launch clock path, data path, or capture clock path. The timing characteristics of the timing paths of a block may vary depending on the analysis mode applied.

A timing view is a combination of one process corner and one analysis mode for one type of timing check, such as setup or hold. A view can be represented as V:(C,M) where V is the name of the View, C identifies a corner, and M identifies a mode. It is noted that certain types of modes can be combined with some but not all corners.

A timing or interface path may show different timing characteristics, and therefore produce a different timing arc to be modeled in an ETM, depending on the applied timing view, due to the differences in corners and analysis modes. Therefore, in prior analysis methodologies, a comprehensive set of possible timing views is determined by combining all applicable corners with all analysis modes that must be applied to these corners. All timing views in the set are then modeled separately, as seen in the example sets of defined views and corresponding ETMs in Table 1:

TABLE 1

| Defined Views | Normal Set of ETMs |
| --- | --- |
| V1: Corner-1, Mode-1 | ETM-V1: Corner-1, Mode-1 |
| V2: Corner-1, Mode-2 | ETM-V2: Corner-1, Mode-2 |
| V3: Corner-2, Mode-1 | ETM-V3: Corner-2, Mode-1 |
| V4: Corner-2, Mode-3 | ETM-V4: Corner-2, Mode-3 |
| V5: Corner-3, Mode-1 | ETM-V5: Corner-3, Mode-1 |
| V6: Corner-4, Mode-1 | ETM-V6: Corner-4, Mode-1 |
| V7: Corner-4, Mode-2 | ETM-V7: Corner-4, Mode-2 |
| V8: Corner-4, Mode-3 | ETM-V8: Corner-4, Mode-3 |

When the circuit design is analyzed under a given timing view, a circuit block may be replaced with the ETM from the block extracted for that view.

Therefore runtime under prior analysis methodologies is generally proportional to the number of timing views. While not all analysis modes need be applied to all corners, the problem of modeling all possible timing views as ETMs is still, in big-O notation, O(mn); that is, the number of iterations is proportional to the number of analysis modes multiplied by the number of corners.

Additionally, the number of resulting ETMs is also proportional to the number of analysis modes multiplied by the number of corners. Loading (instantiating) a top-level analysis is a time-intensive process, and must be done from scratch whenever an ETM needs to be changed; as this happens whenever a new timing view is being considered under prior methodologies, this number of ETMs can become burdensome.

2. Compatibility Groups

A compatibility group represents a set of timing views that are compatible with each other, "compatible" meaning that they may be more likely to have the same timing characteristics (or, in some embodiments, other characteristics) for the same timing path. Therefore, by combining a set of compatible timing views into a single compatibility group, simulation redundancy may be reduced or eliminated, as fewer models need be generated by the compatibility group for a top-level static timing analysis simulation, and the model may be used for all compatible timing views of the compatibility group. This may be accomplished by mapping the compatible timing views to the compatibility group.

A set of compatibility groups is preferably generated from a larger, incompatible set of timing views categorized under a compatibility test, such that (a) each timing view in the larger set is mapped to one and only one compatibility group (that is, there is no intersection between compatibility groups), and (b) no timing view mapped to a compatibility group could be mapped to another compatibility group in the set of compatibility groups other than the one it is in under the compatibility test (that is, each compatibility group is distinct from the others). Due to the latter preferred requirement, compatibility groups are sometimes, for convenience, referred to by the distinct view that they represent.

When stored as a data structure, a compatibility group preferably includes a master timing view and a list of compatible timing views.

The list of compatible timing views, or list of compatible views, lists all timing views determined to be compatible with the others in the list. These compatible views are therefore mapped to the compatibility group. The list need not contain the actual data structures of the timing views, but may provide an address in storage or a unique identifier instead. However, for convenience, the timing views listed in the list of compatible timing views of the compatibility group, or otherwise mapped to the group, will be sometimes described herein as "in" or "of" the compatibility group.

The master timing view, or master view, is a representative timing view which will represent all compatible timing views of the compatibility group for the purposes of computations. The data structure of the master view may simply be the complete data structure of the representative timing view, and therefore the master view and the representative timing view will be referred to interchangeably for convenience; however, in some embodiments the master view may also contain other information, and/or may merely identify the representative timing view. The selection of a representative timing view as the master view may be kept somewhat arbitrary, as by definition any of the compatible timing views may represent any other for the purposes of computations. However, preferably, to ensure that a master view exists, the first timing view added to the list of compatible views of a compatibility group is also selected as the master view.

It has been observed that, when modeled as a timing arc, a timing path is more likely to maintain, within a threshold, important timing characteristics such as delay under the same set of relevant operating conditions—that is, the same process corner—when the analysis mode is altered. This means that, under a preferred definition of the term, two timing views will be "compatible" when they have identical process corners. In some embodiments, a slight variation in the process corners, within a defined threshold for each, is acceptable within the definition of "compatible."

The relevant operating conditions which are part of a process corner may specifically be one or more of: a process (e.g. slow, typical, fast; wide, narrow, tall, short, K) operating in the modeled block, a supply voltage applied to the modeled block, a temperature under which the modeled block is operating, a power/ground state of the modeled block, and one or more on-chip variation values. The first three conditions are sometimes referred to collectively as Process-Voltage-Temperature, or PVT, and are preferably among the relevant conditions.

Therefore, a first timing view is preferably determined under a compatibility test to be compatible with a second timing view by a comparison of the corners of the two timing views. If each of the relevant operating conditions of the corner of the first timing view is the same as each corresponding operating condition of the corner of the second timing view, the two are determined to be compatible. Additionally, a timing view is preferably determined to be compatible with a compatibility group if each of the relevant operating conditions of the corner of the timing view is the same as each corresponding operating condition of the corner of any timing view of the compatibility group. In the latter case, for convenience, the master view of the compatibility group will be used for the compatibility determination, although by definition any timing view in the list of compatible views of the compatibility group will provide an accurate determination.

It is noted, however, that many principles herein are applicable to other definitions of "compatible" which may be selected for other types of computations or simulations, including those unrelated to timing, and that the means of adapting the disclosed embodiments of the invention to these other definitions of "compatible" will be apparent to those of skill in the art. As one example, clock compatibility, where one clock may be derived from another or shares a phase relationship with another, may be a relevant definition of "compatible" when applied to other aspects of static timing analysis.

One or more compatibility groups may be created by grouping a plurality of timing views by compatibility, thus mapping or categorizing each to one (or more) of said groups.

Figure 2:
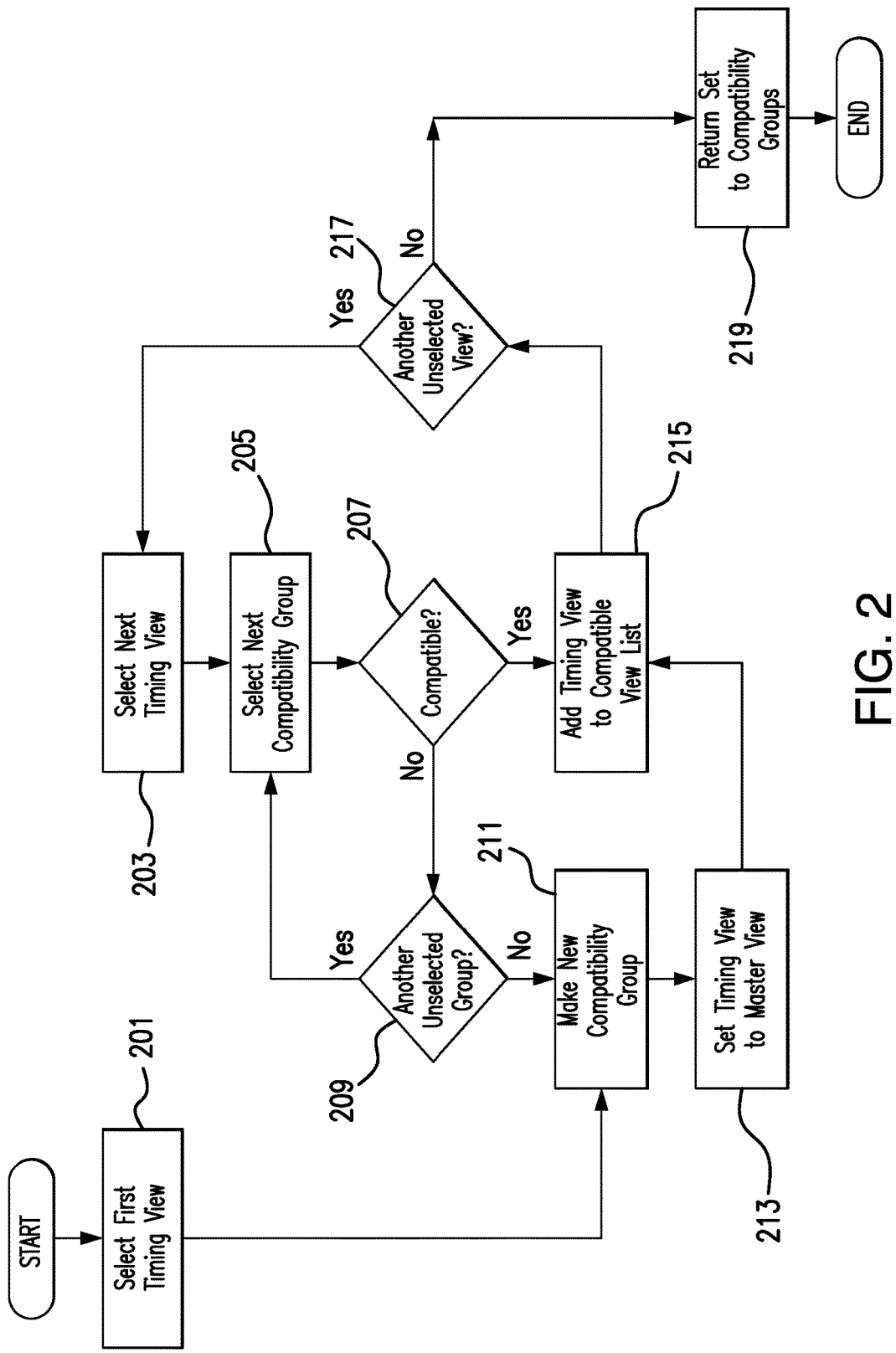
FIG. 2 is a block flowchart illustrating a process of generating one or more compatibility groups from a plurality of timing views, in accordance with one exemplary embodiment of the present invention.

FIG. 2 is a block flowchart illustrating a process of generating one or more compatibility groups from a plurality of timing views, in accordance with one exemplary embodiment of the present invention. This process may be performed by a View Definition Analyzer, described in greater detail elsewhere herein.

For a first iteration of the process, at block 201, a first timing view is selected from the plurality of timing views. Which is selected first may be arbitrary, so long as the same timing view is not re-selected in a later iteration. For the first iteration, no compatibility groups have been generated, so the process preferably proceeds immediately to block 211 where a new (first) compatibility group is generated and added to a list or set of compatibility groups. The first timing view is preferably assigned as the master view of the new compatibility group at block 213, and also added to the list of compatible views for the new compatibility group at block 215. Finally, the process confirms that there is at least one unselected timing view at block 217.

For all following iterations, a next timing view is selected from the plurality of timing views at block 203. The process furthermore selects an existing compatibility group at block 205; for the second iteration, there is only one to select, but in later iterations there may be several. The selections of timing view and compatibility group may be arbitrary, so long as the timing view has not already been selected in a previous iteration, and so long as the same compatibility group has not already been selected in a previous iteration for the same timing view.

It is now tested, at block 207, whether the selected timing view and selected compatibility group are compatible. If they are, the selected timing view is added to the list of compatible views for the selected compatibility group at block 215. Preferably, a master view for the selected compatibility group has already been assigned when it was generated, at block 213; if not, the present selected timing view may be so assigned at this time. The process then checks whether there is at least one unselected timing view at block 217 as before.

If the selected timing view and selected compatibility group are not compatible, the process checks whether there is at least one unselected compatibility group for the selected timing view at block 209. If there exists a compatibility group that has not yet been compared to the selected timing view for compatibility, the process preferably returns to block 205 to select that compatibility group and repeat the subprocess.

If there does not exist a compatibility group that has not yet been compared to the selected timing view for compatibility—that is, if all existing compatibility groups have been compared to the selected timing view (and none were compatible, or the process would have moved to block 215), then a new compatibility group is generated using the selected timing view, proceeding through blocks 211, 213, and 215 as was the case with the first iteration of the process.

This process continues through additional iterations until, at block 217, it is determined that there are no more unselected timing views. If there are not, the process outputs the list or set of compatibility groups at block 219 and finishes.

3. ETM Generation

Methods of extracting ETMs from a circuit design are well-known in the art and, other than those features newly implemented in accordance with certain aspects of the present invention, will not be described in detail. Two common methods for extracting ETMs are graph reduction and path enumeration. An adaptation of path enumeration is preferable for the disclosed embodiment and will be assumed for the purposes of the description to follow. However, those of skill in the art will be able to adopt the principles herein to graph reduction as well as other suitable methodologies.

In shortened form, path enumeration operates by (for each interface path to be modeled): identifying the worst-case timing path and its sequence of pins, computing timing characteristics and parameters (such as input slew and output load) from one pin to the next to extract a pin-to-pin timing arc, and merging these pin-to-pin timing arcs into a complete ETM timing arc for the interface path. As previously noted, a corresponding clock path may also be modeled in the same manner and included in the ETM timing arc, although for reasons of brevity this additional modeling will be omitted from the descriptions to follow. The complete resulting set of ETM timing arcs, one arc for each interface path, is then stored to an ETM.

The computing of the timing characteristics is sometimes referred to in the art as "characterizing" the path.

It should be noted that the above descriptions assume the characterization of a timing arc representing a series of pins in sequence. This will continue to be assumed for the remainder of this disclosure, to simplify illustration of the principles herein. However, the characterization of certain non-sequential arcs such as port-to-port combinational arcs, interface check arcs, and so forth require other, if similar, characterization methods. As these methods are also well-known, it will be within the understanding of those of skill in the art to adapt the disclosed principles to these other methods.

Because the timing characteristics of each timing path may be expected to vary based on the timing view, in prior methodologies this process is repeated for all possible timing views, and therefore the runtime for extracting the ETMs is proportional to the number of timing views.

Figure 3A:
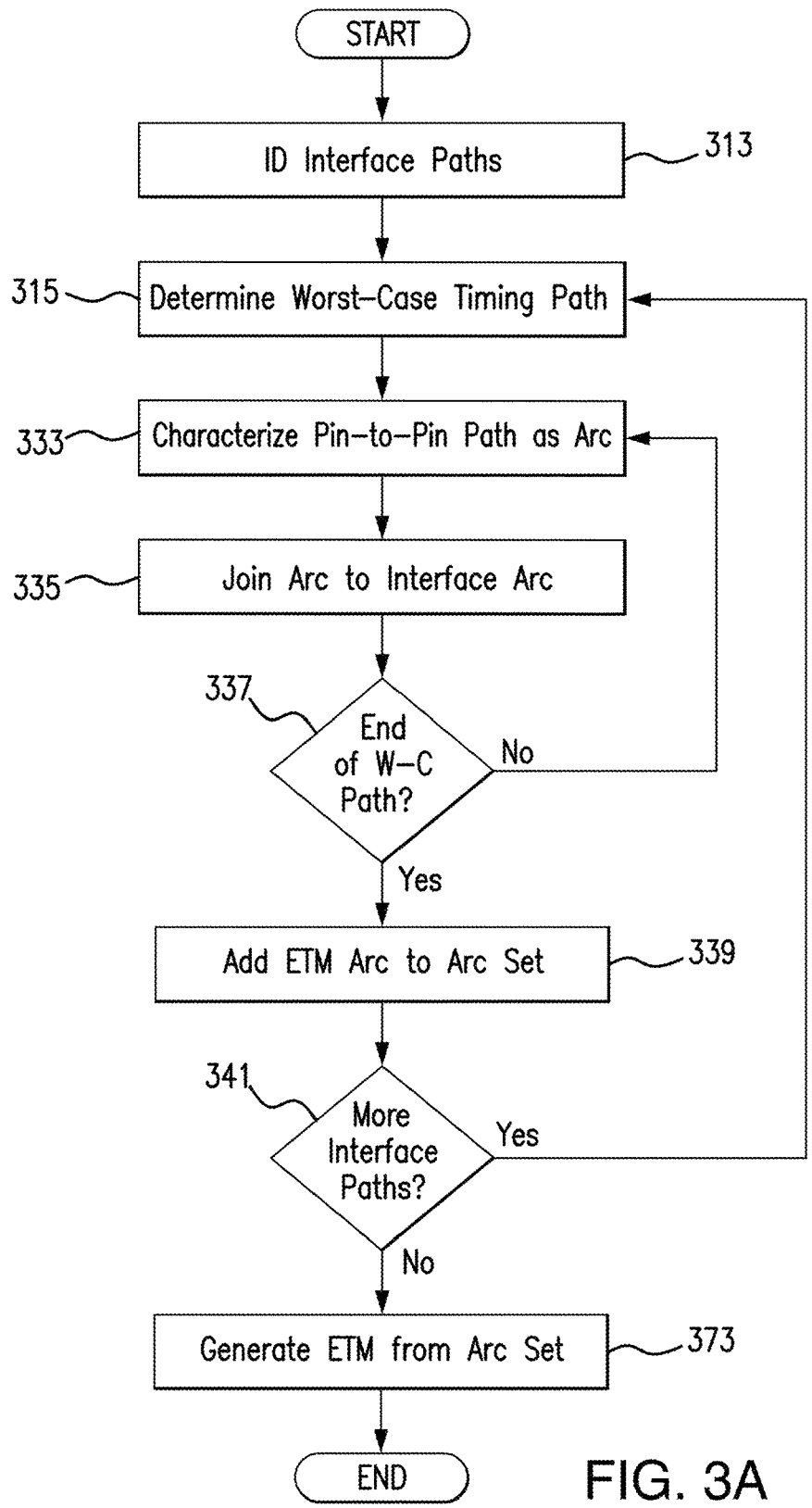
FIG. 3A is a block flowchart generally illustrating a path enumeration process for a circuit block.

FIG. 3A is a flowchart generally illustrating a path enumeration process for a circuit block, under a single "active" timing view. At block 313, the circuit block is analyzed under an active timing view to identify all interface paths. One of these interface paths is selected at block 315 and a worst-case timing path is determined, along with initial timing characteristics for this worst-case timing path such as the sequence of pins, a set of slews at the source, and a set of loads at the sink.

At block 333, timing characteristics between two pins of the worst-case timing path are computed using the timing view. As described previously, these characteristics may include input (source) and output (sink) pins, rising and falling transitions at both pins, input slew, output load, output slew, and delay. From these characteristics, a pin-to-pin timing arc is generated as a data structure. It is noted that the slew for the timing arc between the first and second pins in the worst-case timing path (a first pin-to-pin timing arc) is the slew of the path itself, and the load for the timing arc between the second-to-last and last pins in the worst-case timing path (a final pin-to-pin timing arc) is the load of the path itself. This process may be known as characterizing a pin-to-pin timing path. Methods of computing these characteristics are known in the art and may, as previously noted, in part use a suitable delay calculation engine or the like.

The pin-to-pin timing arcs are preferably selected and characterized serially along the length of the worst-case timing path—that is, a first iteration of block 333 preferably characterizes the timing arc between a first and second pin, the second iteration preferably characterizes the timing arc between a second and third pin, and so on until the final pin-to-pin timing arc is characterized.

The new pin-to-pin timing arc is then joined into an interface timing arc representing the entire worst-case timing path up to the latest pin, at block 335. For the first iteration of block 335, the interface arc is simply the new (first) pin-to-pin timing arc. For a second (or later) iteration, since the new pin-to-pin arc is serially oriented with the unjoined interface timing arc, the following computations may be used for the characteristics of the joined interface timing arc:

The source and source transition values are unchanged from the unjoined interface arc to the joined interface arc.

The sink, sink transition, load, and outslew values of the joined interface arc are set to the corresponding values of the new pin-to-pin arc.

The outslew of the unjoined interface arc is added to the inslew of the unjoined interface arc to obtain the inslew of the joined interface arc.

The delay of the new pin-to-pin arc is added to the delay of the unjoined interface arc to obtain the delay of the joined interface arc.

As noted previously, for convenience this disclosure assumes a linear sequence of pins. Especially for timing paths or desired arcs where this is not the case, other methods of breaking down the timing path and joining the resulting timing arcs may be more preferable.

It is then determined at block 337 if the end of the worst-case timing path has been reached (that is, if the pin-to-pin arc that was just joined was the final pin-to-pin timing arc). If not, the process returns to block 333 to characterize and join the next pin-to-pin timing path. Otherwise, the entire worst-case timing path has been characterized in the joined interface arc, and the process therefore continues to block 339 where this interface arc is converted to an ETM arc and added to a set of ETM arcs. The ETM arc may be identical to the interface arc, or it may be a data structure containing additional data about the arc, such as applicable constraints (e.g. a clock source, or a power or ground line).

The process then checks, at block 341, whether there are more interface paths from the set identified in block 313 that have not yet been characterized and converted into an ETM arc. If there are, the process returns to block 315 to repeat for a newly selected interface path. If, however, all interface paths have been characterized, an ETM is generated from the completed set of ETM arcs and associated with the present timing view at block 373. Techniques for generating a complete ETM from a set of ETM arcs are well-known in the art and will not be detailed here. With the ETM generated, the process ends.

It is noted that the process as depicted is preferably repeated from the top for each applicable timing view to generate separate ETMs for each.

An ETM may contain multiple ETM arcs. In the above process, one ETM arc is created for each interface path. However, by combining multiple ETM arcs representing the same interface arc, one for each timing view in a compatibility group, into a single ETM for the entire compatibility group, a minimal set of ETMs may be extracted and analyzed. In contrast to the normal set of ETMs seen, for example, in Table 1 above, this minimal set may be able to reduce the number of ETMs significantly, as illustrated by way of example in Table 2:

TABLE 2

| Defined Views | Normal Set of ETMs | Minimal Set of ETMs |
| --- | --- | --- |
| V1: Corner-1, Mode-1 | ETM-V1: Corner-1, Mode-1 | ETM-V1-V2: Corner-1, Mode-1 + Mode-2 |
| V2: Corner-1, Mode-2 | ETM-V2: Corner-1, Mode-2 | |
| V3: Corner-2, Mode-1 | ETM-V3: Corner-2, Mode-1 | ETM-V3-V4: Corner-2, Mode-1 + Mode-3 |
| V4: Corner-2, Mode-3 | ETM-V4: Corner-2, Mode-3 | |
| V5: Corner-3, Mode-1 | ETM-V5: Corner-3, Mode-1 | ETM-V5: Corner-3, Mode-1 |
| V6: Corner-4, Mode-1 | ETM-V6: Corner-4, Mode-1 | ETM-V6-V7-V8: Corner-4, Mode-1 + Mode-2 + Mode-3 |
| V7: Corner-4, Mode-2 | ETM-V7: Corner-4, Mode-2 | |
| V8: Corner-4, Mode-3 | ETM-V8: Corner-4, Mode-3 | |

Because every possible timing view is compatible with at least one compatibility group, each of the possible timing views will be represented in the minimal set of ETMs. Because the compatibility groups each include a list of compatible timing views, the compatibility group, and thereby the ETM, that represents any specific timing view may be found should the specific timing view require simulation. Furthermore, a single top-level instantiation, using an ETM representing a group of compatible timing views, will be able to produce simulation results for all timing views in the group of compatible timing views, significantly decreasing the number of instantiations and an overall simulation time.

Each ETM in the minimal set may also include a list of compatible views. This information may, for instance, be stored in the file name: as a simple example, an ETM for a first block that represents both a first and third view might be named block1_etm.view1.view3.lib. A mapping of timing views to ETMs may also, or alternatively, be stored elsewhere.

Illustrative processes for generating a minimal set of ETMs will now be described.

Figure 3B:
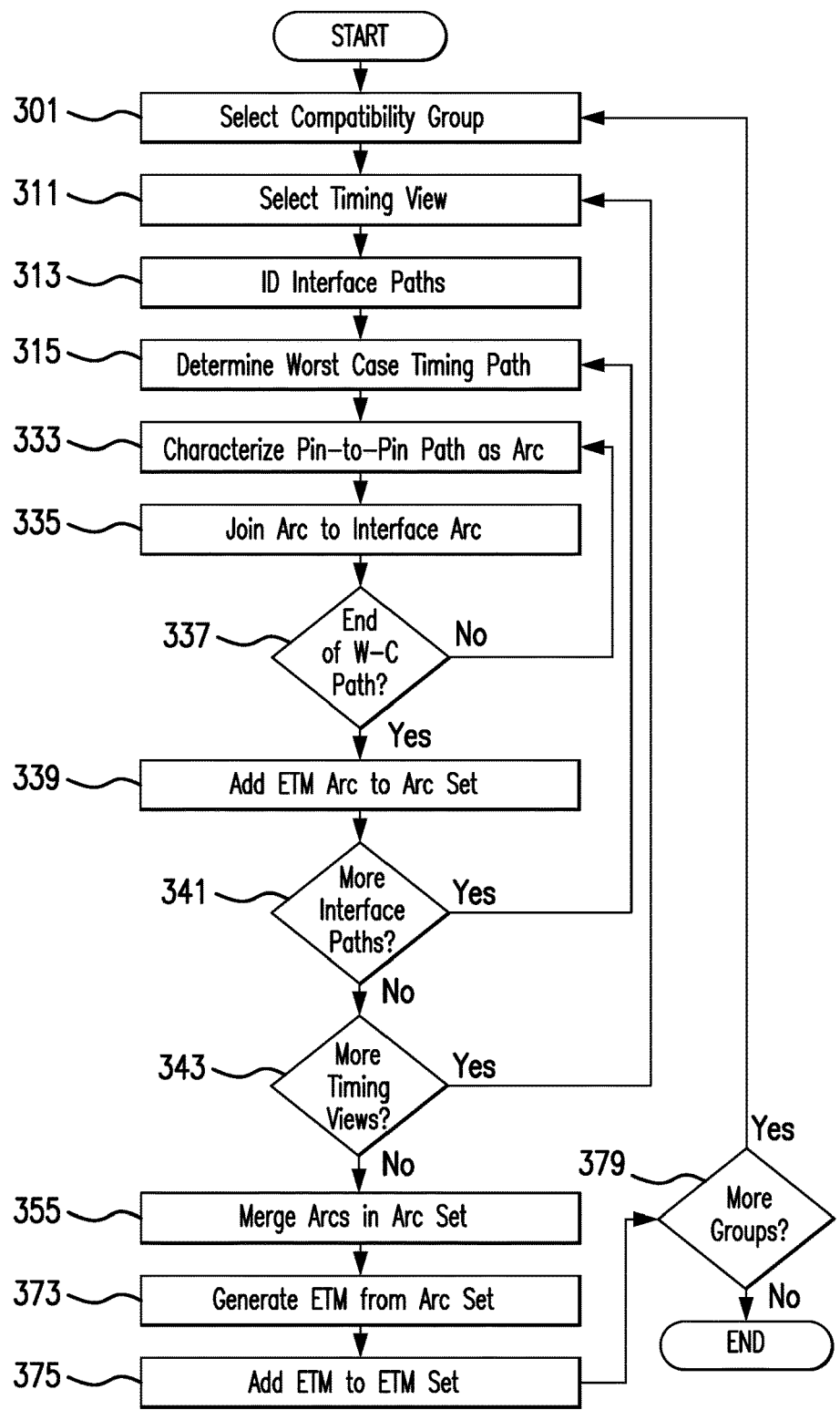
FIG. 3B is a flowchart illustrating another path enumeration process, in accordance with an embodiment of the present invention.

FIG. 3B is a flowchart illustrating another path enumeration process, in accordance with an embodiment of the present invention.

Many of the individual operations are carried out as illustrated in the process of FIG. 3A. However, compatibility groups are now considered. Preferably, a list or set of compatibility groups is first determined, using the process depicted in FIG. 2 or similar. In this embodiment, it is preferable that the ETM arc data structure, in addition to the data of the originating interface arc, include an identifier of the active timing view.

At block 301, a compatibility group is selected from the set of compatibility groups. Block 311 selects a timing view from the selected compatibility group, which will be active for the computations that follow.

Blocks 313, 315, 333, 335, 337, 339, and 341 then operate as illustrated in the process of FIG. 3A. However, once block 341 has determined that all interface paths have been characterized and converted to ETM arcs in the ETM arc set, block 343 determines whether more timing views exist in the selected compatibility group. If so, the process returns to block 311 to select a new timing view from the selected compatibility group and repeat the subprocess, generating more ETM arcs which are also added to the same ETM arc set over iterations of block 339.

When block 343 determines that all timing views in the compatibility group have been considered, the resulting ETM arc set will contain A×B ETM arcs, where A is the number of interface arcs in the circuit block, and B is the number of timing views considered.

At block 355, each ETM arc in the set is evaluated against each of the others to either merge the two arcs completely, partially, or not at all.

At least a partial merging occurs when each timing characteristic of one ETM arc matches the corresponding timing characteristic of the other ETM arc. Preferably, a tolerance or margin may be designated in advance for each of the numerical characteristics—inslew, load, outslew, and delay—such that two ETM arcs may still merge if these characteristics match within this margin rather than identically. However, the source and sink pins and their respective transitions, which are not numerical values, should match identically.

A complete merging occurs when all timing characteristics of the two ETM arcs match, within a designated tolerance, and all constraints also match. Constraints may include but are not limited to a clock source or a power and/or ground line. More details of the implementation of these constraints will be described further herein.

ETM arcs that have been completely merged are preferably represented by a single data structure, with a parameter stating all applicable timing views. That is, if a first ETM arc was generated under a first timing view and a second ETM arc was generated under a second timing view, a completely merged ETM arc data structure resulting from the two has a parameter naming both the first and second timing views. Alternatively, the two analysis modes may be named instead. When an ETM including this ETM arc is instantiated and either timing view is simulated, the ETM arc may be identified from this parameter as applicable to the timing view being simulated.

ETM arcs that have been partially merged are preferably represented by a single ETM arc data structure, with a field for each timing view designating differences in the constraints. That is, if a first ETM arc was generated under a first timing view and requires a first clock source, and a second ETM arc was generated under a second timing view and requires a second clock source, the completely merged ETM arc data structure has two fields identified by the first and second timing views (or corresponding analysis modes), respectively. The first field preferably names the first clock source, and the second field preferably names the second clock source. When an ETM including this ETM arc is instantiated and either timing view is simulated, the ETM arc may be identified from the correct field as applicable to the timing view being simulated, and the constraints specifically for the simulated timing view may be used.

In some embodiments, ETM arcs are completely merged even when the constraints do not match, and the different constraints are managed purely by means of an assertion set, which will be described further herein. This approach tends to allow for quicker merging and smaller ETM file sizes, but typically at a cost of processing time during the top-level simulation.

It is noted that an ETM arc that has already been merged may still be evaluated against other ETM arcs for yet more merging, such that more than two ETM arcs may be completely or partially merged. Indeed, a merged ETM arc may have both completely and partially merged arcs. Preferably, block 353 terminates only when it is determined that no more merging is possible.

Using the set of merged ETM arcs, an ETM is generated as before at block 373, but unlike in FIG. 3A, it is associated with all timing views in the compatibility group rather than just one. Additionally, rather than simply concluding the process after block 373, the ETM is added to a set of ETMs at block 375.

At this point, it is determined at block 379 whether all compatibility groups have been considered and, thereby, whether an ETM has generated for each of said groups. If not, the process returns to block 301, selects a new compatibility group, and repeats the process to generate another ETM for this new compatibility group. If all compatibility groups have been considered, the set of ETMs is a completed minimal set of ETMs, and the process may end.

Figure 3C:
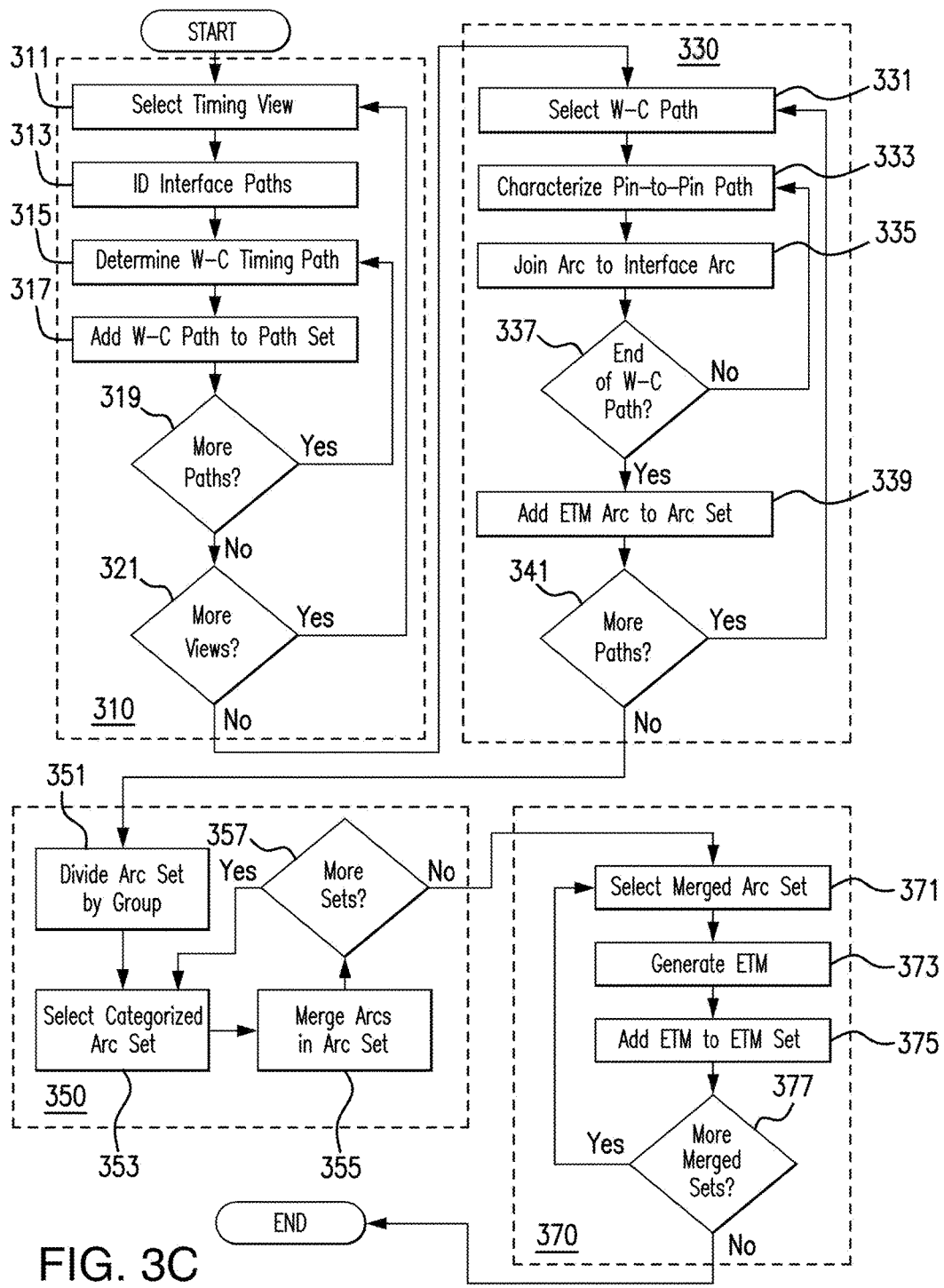
FIG. 3C is a flowchart illustrating a concurrent variation on the path enumeration process of FIG. 3B, in accordance with another embodiment of the present invention.

FIG. 3C is a flowchart illustrating a concurrent variation of the path enumeration process of FIG. 3B, in accordance with another embodiment of the present invention.

Many of the individual operations are carried out as illustrated in the process of FIG. 3B. However, rather than repeat the entire process for each compatibility group, the process is divided into stages which may be completed individually before moving on to the next stage, or in parallel with previous stages.

In stage 310, which may be treated as a path enumeration stage, a timing view is selected at block 311 from a set of applicable timing views and made "active." Unlike the embodiment depicted in FIG. 3B, this timing view need not be limited to any particular compatibility group, although it is preferable that all timing views from one group be selected before those from a next group, for reasons that will be explained further herein.

As in the embodiment of FIG. 3B, the circuit block is analyzed to identify all interface paths at block 313, and one is selected at block 315 to determine a worst-case timing path and initial characteristics thereof, under the selected timing view. However, rather than immediately being characterized, the worst-case timing path determined in block 315 is added to a set of worst-case timing paths at block 317. The process then immediately, at block 319, determines whether more interface paths from the set identified in block 313 remain, and if so repeats blocks 315 and 317 to determine the worst-case timing path for a next interface path and store it to the set of worst-case timing paths.

If all interface paths have been considered, it is determined at block 321 whether there exists an additional timing view from the set of applicable timing views to be considered. If so, stage 310 is repeated from block 311 for the next timing view, adding more worst-case timing paths to the set of timing paths. When block 321 determines that all timing views have been considered, the process flows to the next stage.

In stage 330, which may be treated as a path characterization stage, one worst-case timing path of the path set from stage 310 is selected at block 331, and is characterized, joined, and converted to an ETM arc, and the ETM arc added to an ETM arc set, in blocks 333 through 339, as in the embodiment of FIG. 3B. It is then determined at block 341 whether there exists an additional worst-case timing path to be considered from the present path set. If so, blocks 331 through 339 are repeated for the additional timing path, generating another ETM arc and adding it to a set of ETM arcs, until all timing paths from the set of worst-case timing paths have been considered. Preferably, all worst-case timing paths for one timing view are considered before moving to those for a next timing view, so as to avoid switching the applicable timing view unnecessarily. When block 341 determines that all worst-case timing paths have been processed, the process flows to the next stage.

In stage 350, which may be treated as an ETM arc management stage, the ETM arc set from stage 330 is divided at block 351 into multiple sets of arcs, each arc categorized to a set by the compatibility group of its associated timing view. One categorized ETM set is selected at block 353, and the ETM arcs within are merged at block 355 as in the embodiment of FIG. 3B. It is then determined at block 357 whether there exists another ETM arc set which has not been evaluated for merging. If so, blocks 353 and 355 are repeated for a next ETM arc set, until all arc sets have been evaluated. When block 357 determines that all ETM arc sets have been evaluated, the process flows to the next stage.

In stage 370, which may be treated as an ETM writing stage, one of the merged ETM arc sets from stage 350 is selected at block 371. Using this merged set, an ETM is generated at block 373 and added to a set of ETMs at block 375, as in the embodiment of FIG. 3B. Block 377 then determines whether there are more merged ETM arc sets to select from, and if so returns to block 371 to select another. If all merged ETM arc sets have been selected and ETMs generated therefrom, the set of ETMs represents a minimal set of ETMs, and the process may end.

Each stage of the process depicted in FIG. 3C may be managed by a different software module and/or a different hardware processor. Therefore, as a variation on the embodiment depicted in FIG. 3C, the stages may operate in parallel. For instance, if the path enumeration stage 310 considers all timing views of a compatibility group before moving to the timing views of a next compatibility group, it may, when a compatibility group is completed, output a current set of worst-case timing paths for that compatibility group. The current set of worst-case timing paths may then be used in the path characterization stage 330, which may begin immediately in parallel while the path enumeration stage 310 is still processing the next group. In turn, the path characterization stage 330 may output a current set of ETM arcs associated with the same compatibility group for use in the ETM arc management stage 350, before processing the paths of the next group. The merged version of this ETM arc set may then be immediately supplied for use in the ETM writing stage 370 to generate the ETM. As an additional advantage of this parallel approach, blocks 351, 353, and 357 of the ETM arc management stage 350 become unnecessary, as all arcs in each ETM arc set received by the ETM arc management stage 350 will be associated with the same compatibility group and will not need to be divided.

It is noted that the concurrency and parallel operation principles described in connection with the embodiment of FIG. 3C are not limited in application to the generation of ETMs representing complete compatibility groups, but may be adapted to the generation of ETMs representing only one timing view each.

As noted previously, although two ETM arcs may have matching timing characteristics, due to the analysis mode they may have other relevant attributes such as constraints that are not identical. These differences may be accounted for by means of an assertion set. During the merging of ETM arcs for a given compatibility group, each timing view in the list of compatible timing views is checked for these differences against the master view, and if a difference is present, an assertion set including one or more appropriate instructions for constraining the behavior of the ETM is generated for the different compatible timing view and retrieved when the different compatible timing view is to be simulated.

Figure 4:
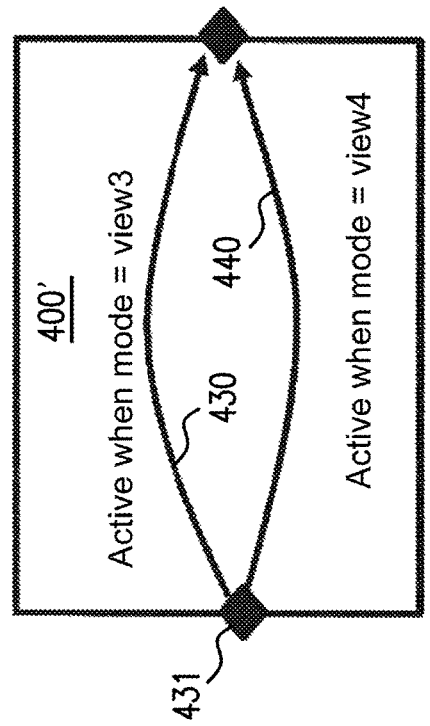
FIG. 4 is a block diagram illustrating two example pairs of timing arcs.
Figure 4:
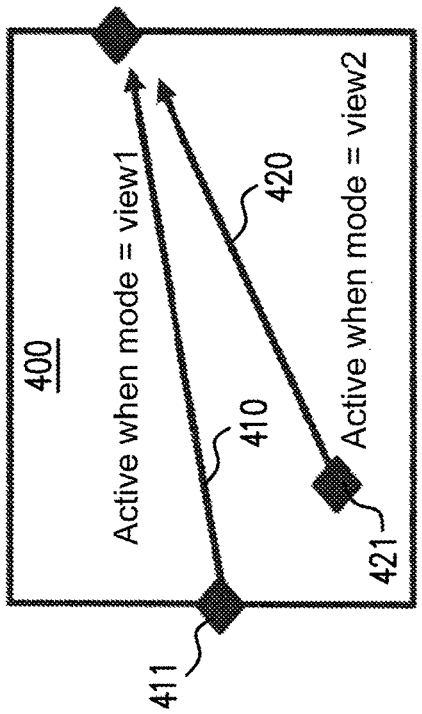

As one example, the different analysis modes of a first and second timing view which are compatible may operate on different generated or source clock signals in a circuit block, namely a first and second source clock, respectively. FIG. 4 illustrates two pairs of timing arcs. In a first pair of arcs 400, a first arc 410 is active under a first analysis mode, and a second arc 420 is active under a second analysis mode. Due to the behavior of these two modes in this section of the circuit block, the first arc 410 uses a first source clock 411, but the second arc 420 uses a second source clock 421. In contrast, in a second pair of arcs 400', a third arc 430 is active under a third analysis mode, and a fourth arc 440 is active under a fourth analysis mode, but due to the behavior of these two modes for the particular interface path, both use the same source clock 431.

For the first pair of timing arcs 400, assuming that the master view for the corresponding compatibility group employs the first analysis mode of the first arc 410, an assertion set will be generated for the second timing view in association with the ETM, this assertion set including a reset-clock instruction to reset the clock of the ETM to the second source clock. That is, a merged arc generated from arcs 410 and 420 will ignore the reset-clock instruction when operating under the first analysis mode (that is, when modeling first arc 410), but will execute the reset-clock instruction when operating under the second analysis mode (that is, when modeling second arc 420). In contrast, because arcs 430 and 440 share a source clock 431, neither will execute the reset-clock instruction, although other annotations or instructions may exist to distinguish the two.

In another embodiment, partial merging is employed, as previously described with respect to block 355 of FIG. 3B. Under this embodiment, arcs 410 and 420 are only partially merged, and the resulting ETM arc includes a field for the first analysis mode that designates the first clock 411 as the source clock, and a separate field for the second analysis mode that designates the second clock 421 as the source clock. In contrast, because arcs 430 and 440 share a source clock 431, they may be completely merged in this embodiment, notwithstanding the different analysis modes.

4. System Implementation

Figure 5A:
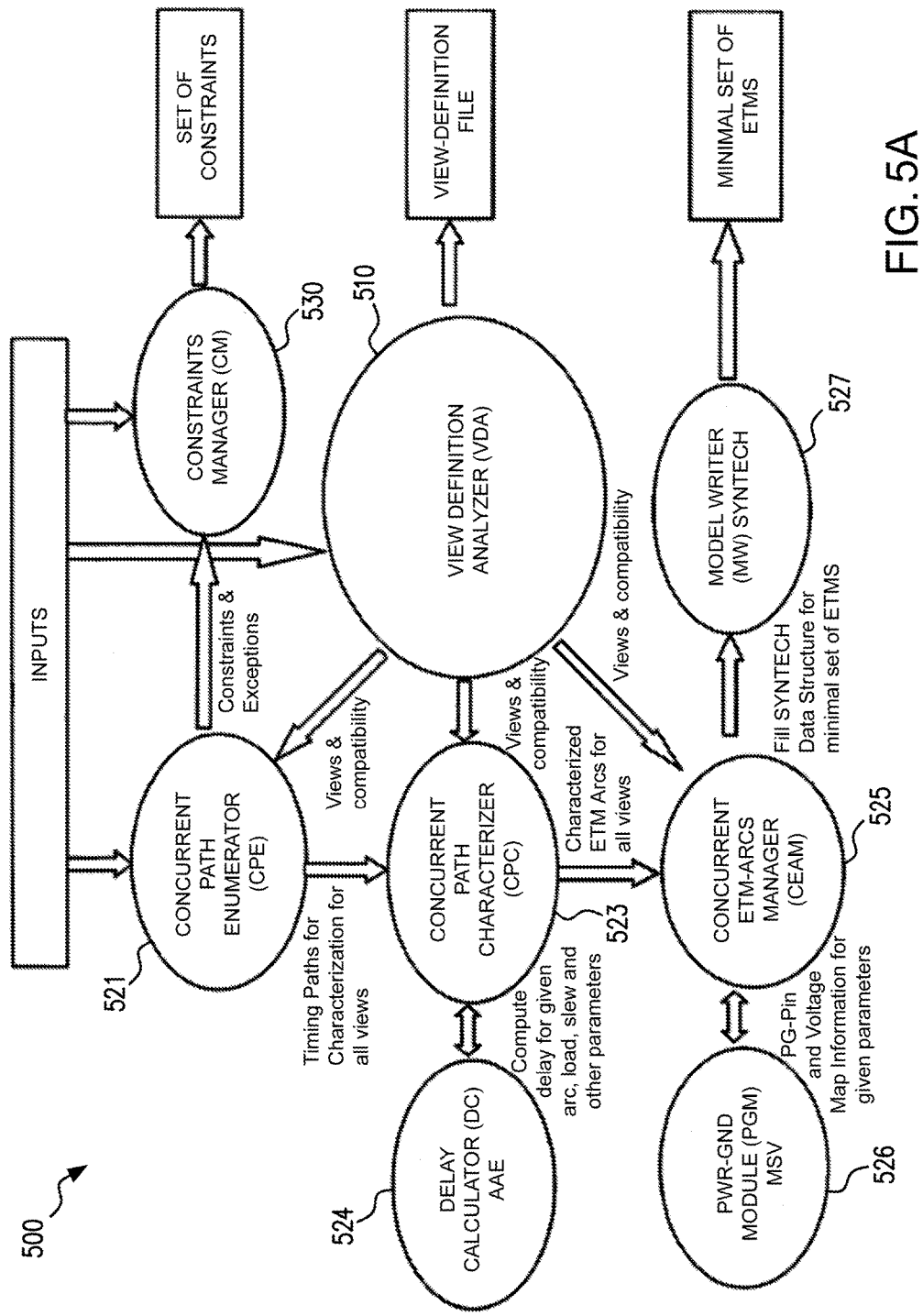
FIG. 5A is a block diagram illustrating a system for generating a minimal set of ETMs for a circuit block, in accordance with an embodiment of the present invention.
Figure 5B:
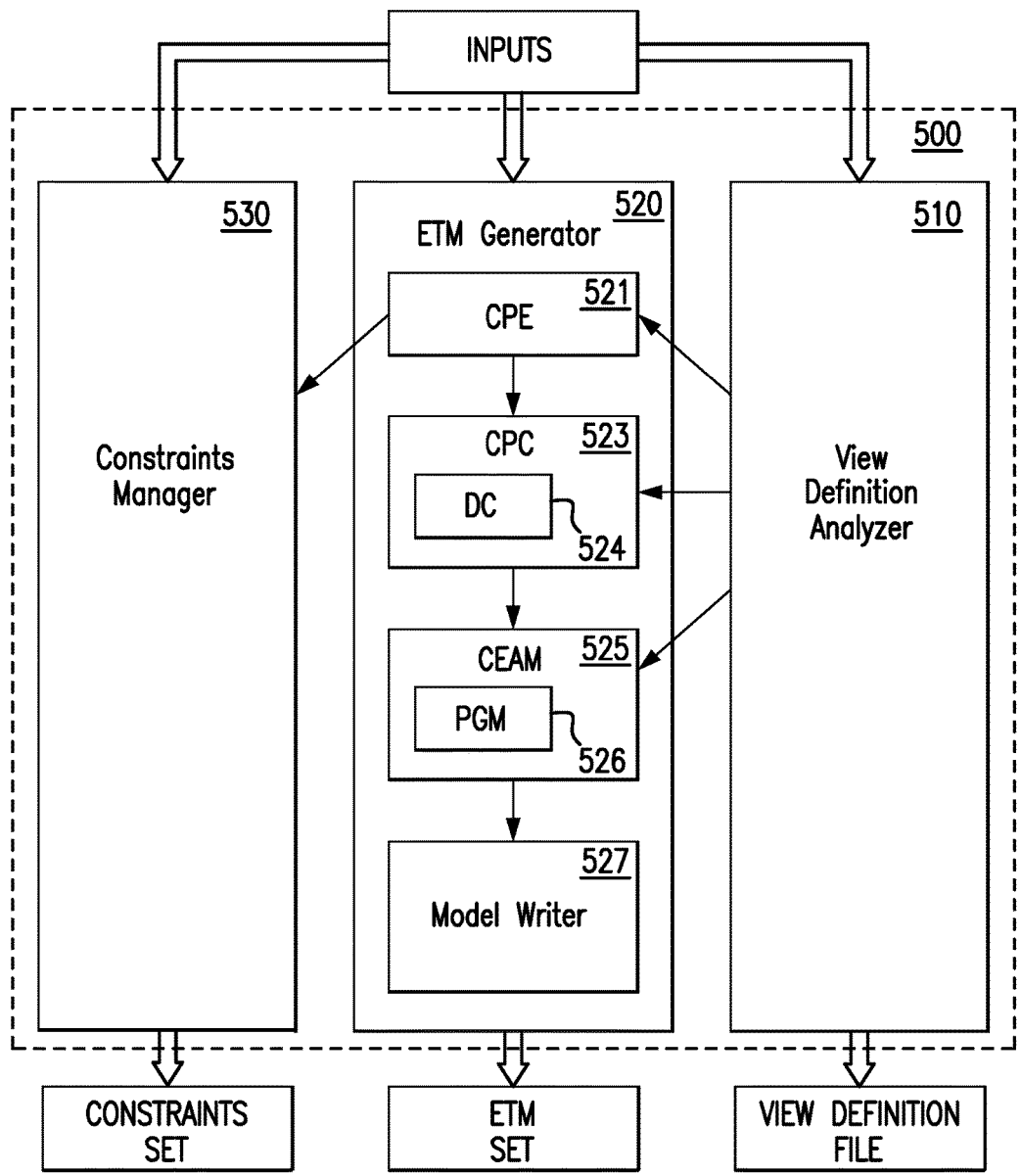
FIG. 5B is a block diagram illustrating an implementation of the functional components of the system of FIG. 5A, in accordance with an embodiment of the present invention.

FIG. 5A illustrates a system for generating a minimal set of ETMs for a circuit block in accordance with one exemplary embodiment of the present invention. FIG. 5B further illustrates an implementation of the functional components of that system in accordance with one exemplary embodiment of the present invention. The system may be implemented on hardware to be described further herein.

Inputs for a given circuit block into a system 500 preferably include one or more of: a netlist of the circuit block, libraries of cells instantiated in the circuit block for different delay-corners, parasitic resistance/capacitance (RC) of the inter-connects for different RC-corners, environment of the design for different constraint-modes, view definitions specifying a list of timing views obtained by the combinations of delay-corners at different operating-conditions (PVT) and analysis modes, and other relevant information/options/settings required for carrying out timing analysis and model extraction of the circuit block.

A view definition analyzer (VDA) 510 takes the above inputs, specifically but not exclusively the timing views, and executes to generate a list of compatibility groups using the processes disclosed above, each compatibility group preferably including a master view and a list of compatible views. This list is preferably outputted as part of a view definition file, which can be used in later top-level simulations of the ETMs in the minimal set. The view definition file may also include information on the timing views, corners, modes, and constraints.

Figure 6:
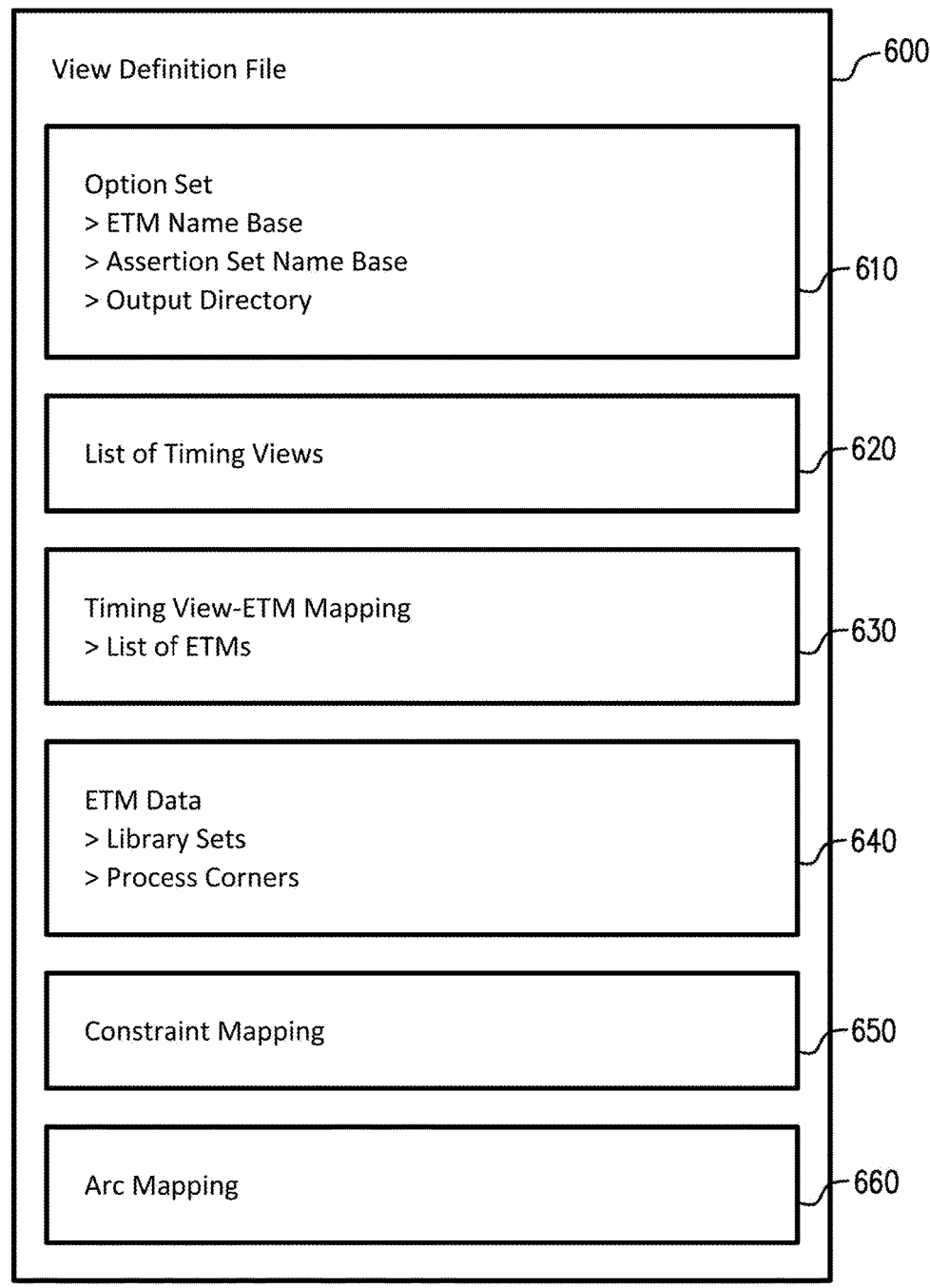
FIG. 6 is a block diagram illustrating an organization of a view definition file, in accordance with an embodiment of the present invention.
Figure 7:
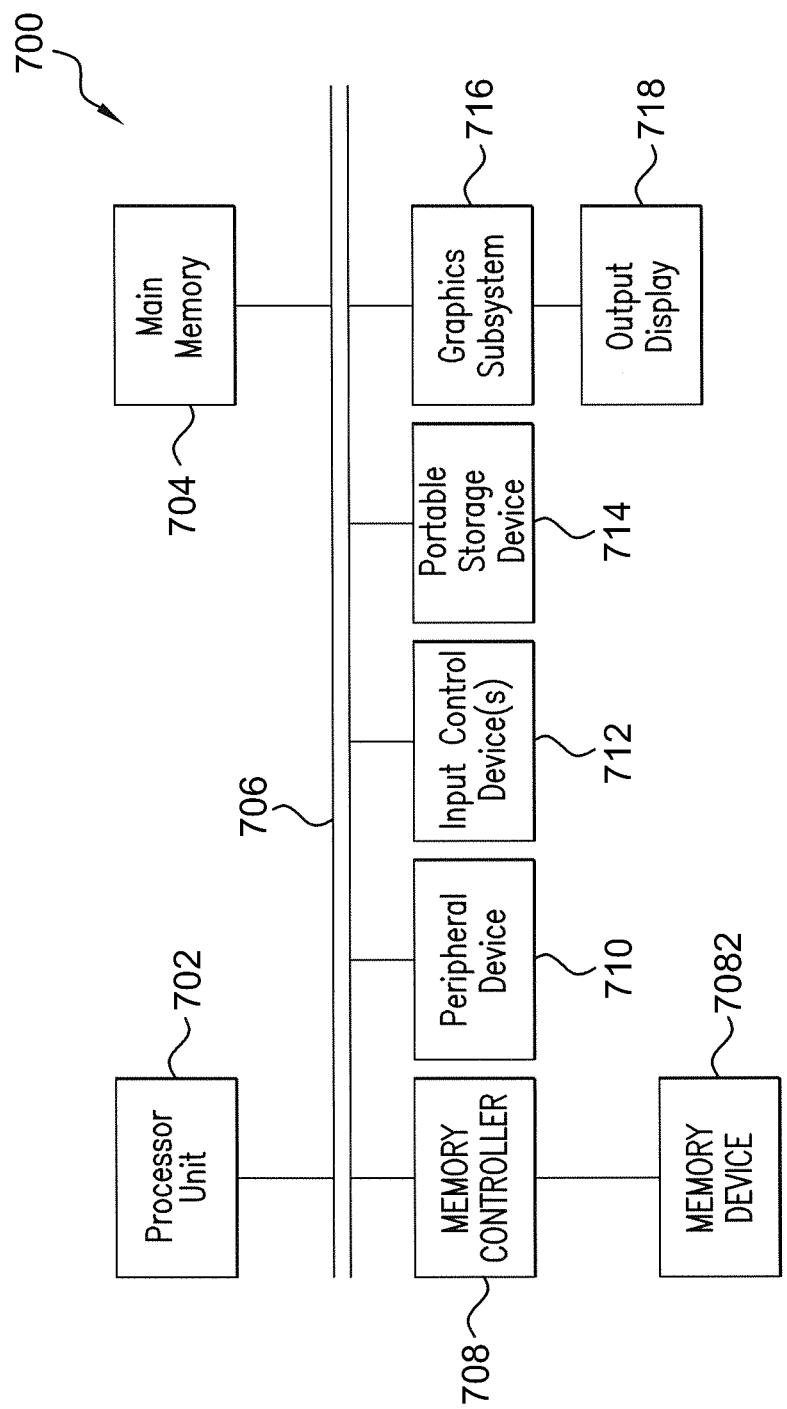
FIG. 7 is a block diagram illustrating an exemplary computer system for programmatic and/or hardware implementation of various embodiments and aspects of the present invention.

One possible organization of a view definition file is illustrated in FIG. 6. It is noted that this file may be organized in many other ways and contain other varieties of information without departing from the scope of the present invention.

The view definition file 600 preferably contains an option set 610, which may include output options such as an ETM name base, an assertion set name base, and an output directory. The name bases are used as a starting point for the name of specific ETMs and assertion sets; for instance, if the ETM name base is "new.lib" then all ETMs generated using this view definition file may, by default, start with "new" and have the .lib file extension. These are preferably defined directly by a user, although they may also have default values.

The view definition file 600 preferably contains a list 620 of all timing views, either generally or applicable specifically to the circuit block.

The view definition file 600 preferably contains a mapping 630 of timing views to the ETM that represents said timing view. That is, if a timing view is listed in the compatibility group which was used to extract an ETM, said timing view will be mapped to said ETM in the mapping 630. The mapping 630 may also include a list of all ETMs and any related files.

The view definition file 600 preferably contains ETM data 640. This data may include, for each ETM, a library set of ETM arcs and the applicable corner.

The view definition file 600 preferably contains a constraint mapping 650, which will map any necessary constraints to each timing view, or more generally to each analysis mode.

The view definition file 600 preferably contains an arc mapping 660. The arc mapping 660 maps the different ETM arcs of each ETM, both merged and unmerged, to each timing view, or more generally to each analysis mode.

Returning to FIGS. 5A and 5B, a concurrent path enumerator (CPE) 521, a concurrent path characterizer (CPC) 523, a concurrent ETM-arcs manager (CEAM) 525, and a model writer 527 are preferably implemented as components of an ETM generator 520, as illustrated in FIG. 5B. The ETM generator 520 takes the above inputs, specifically but not exclusively the timing views, and also receives the list of compatibility groups from the VDA 510. The ETM generator 520 then executes to extract the ETMs for the master view of each compatibility group, and outputs the minimal set of ETMs. The ETM generator 520 preferably does so by the process depicted in FIG. 3C, but may also do so through the process depicted in FIG. 3B, or other similar processes.

In some embodiments, a constraints manager 530 is also present and executes to generate assertion sets based on the analysis mode data provided as input, which are preferably outputted in a constraint-definition file. In other embodiments, these assertion sets are generated by the ETM generator 520 and outputted with the minimal set of ETMs.

The CPE 521 executes to identify all sequences of timing paths, to enumerate sets of interface timing-paths for various combinations of transitions (rise/fall) and conditions (early/late), and to enumerate the worst-case timing path for an interface path in a circuit design block. These processes are largely known in the art of path enumeration. However, the CPE 521 may generate a set of enumerated worst-case timing paths for multiple timing views in a single process and output the entire set to the CPC 523, by for example the path enumeration stage 310 of FIG. 3C, thus conserving runtime. The CPE 521 also preferably receives the list of compatibility groups from the VDA 510, and may employ it in the enumeration to enumerate all worst-case timing paths for each compatibility group, which then may be further processed by the CPC 523 while the CPE 521 continues to enumerate the paths of a next compatibility group in parallel.

In embodiments where a separate constraints manager 530 is present, the CPE 521 also preferably passes the constraints of the timing views to the constraints manager 530.

The CPC 523 executes to compute timing characteristics of each worst-case timing path, such as input slew and output load, and for each such path generates an ETM timing arc which contains this information. The timing characteristics and in particular the output delay value are preferably computed more specifically by a delay calculator 524, which is preferably included in the CPC 523, as illustrated in FIG. 5B, but may also be a separate component. Processes for these computations are largely known in the art of path enumeration. However, the CPC 523 may generate a set of ETM arcs for multiple timing views in a single process and output the entire set to the CEAM 525, by for example the path characterization stage 330 of FIG. 3C, thus conserving runtime. The CPC 523 also preferably receives the list of compatibility groups from the VDA 510, and may employ it to compute all ETM arcs, and in particular their delay values, for each compatibility group, which then may be further processed by the CEAM 525 while the CPC 523 continues to characterize the paths of a next compatibility group in parallel. In some cases, the computed characteristics may also be stored in a cache to be retrieved when it can be determined that a new worst-case timing path will share these timing characteristics, again conserving runtime by avoiding the re-computation.

The CEAM 525 executes to perform multiple functions. It preferably maintains a mapping of each ETM arc to its corresponding timing views and compatibility group.

Additionally, based on the information contained in the ETM arcs and the information of the compatible views from the VDA 510, the CEAM 525 merges ETM arcs with matching (within a tolerance) timing characteristics into a single arc. In some embodiments, the ETM arcs are completely merged only if the constraint attributes (such as source clocks) of the merged ETM arcs corresponding to the various modes are also the same. This merging may be conducted by, for example, the ETM arc management stage 350 of FIG. 3C.

The CEAM 525 also preferably annotates mode identifiers (or timing view identifiers) and other information into the ETM arc, such that when a particular mode is activated during later instantiation of the ETM at the top-level, characteristics of the ETM arc corresponding to that mode are activated. These mode identifiers may be abbreviated or omitted if the merged arc behaves the same under all possible modes; that is, if it is completely merged.

The merged ETM arcs, with mode annotations, are then outputted to the model writer 527. The CEAM 525 preferably receives the list of compatibility groups from the VDA 510, and may employ it in the merging and annotation process to merge all ETM arcs for each compatibility group, which then may be further processed by the CPC 523 while the CEAM 525 continues to merge the ETM arcs of a next compatibility group in parallel.

A power-ground module 526 is preferably included and models associated power rails for an ETM arc. When this module is activated, it models the power and ground rails related to the signal pins and ports modeled in an ETM arc. These rails may be defined in the ETM arc as constructs, in association with the ports (for instance, a clock port may be associated in the ETM with particular defined power and ground pins, the power pin with a defined voltage). The CEAM 525 then annotates this information into the ETM arc. The power-ground module 526 is preferably included in the CEAM 525, as illustrated in FIG. 5B, but may also be a separate component. The power-ground module 526 may be activated or deactivated through an interface as needed.

The model writer 527 executes to generate ETMs, each ETM based on a merged and annotated ETM arc set from the CEAM 525. The processes for doing so with an unmerged ETM arc set are well known in the art and will not be detailed herein, and those of skill in the art will be able to adapt these processes to a merged ETM arc set. However, the model writer 527 preferably generates all ETMs in the minimal set before outputting them concurrently. This generation may be conducted by, for example, the ETM writing stage 370 of FIG. 3C.

It is noted again that each stage of the ETM generation may be completed, or completed for all timing views in a compatibility group, before moving to the next stage. This is an advantage over previous systems which would generate a single ETM for one timing view through a single, lengthy process before moving on to the next, and is made practical by, among other things, the organization of timing views into compatibility groups and the removal of redundant computations at each stage.

Additionally, using the processes disclosed above, both the extraction and general analysis processes are reduced from O(mn) to O(n)—that is, their runtime is proportional only to the number of corners—resulting in considerable runtime savings.

Table 3, below, shows the comparison of runtime of the existing flow in which ETMs are extracted one-by-one for all the views with the runtime of the proposed flow in which a minimal set of ETM is extracted concurrently for all the views. The results show that the runtime of the proposed flow is more than five times faster than the existing flow in most of the cases. Moreover, the proposed methodology generates a minimal set of ETMs which is less than the number of ETMs generated by the existing flow.

TABLE 3

| | Full ETM Set, Individual Extraction | | | Minimal ETM Set, Concurrent Extraction | | Runtime |
|---|---|---|---|---|---|---|
| Test # | # of Views | # of ETMs | Runtime (min) (T1) | # of ETMs | Runtime (min) (T2) | Improvement (T1/T2) |
| 1 | 1 | 1 | 4:14 | 1 | 4:14 | 1.0 |
| 2 | 2 | 2 | 20:59 | 1 | 10:53 | 1.9 |
| 3 | 2 | 2 | 3:56 | 2 | 0:19 | 12.4 |
| 4 | 4 | 4 | 40:49 | 1 | 23:19 | 1.8 |
| 5 | 8 | 8 | 10:19 | 2 | 1:01 | 10.2 |
| 6 | 16 | 16 | 17:45 | 4 | 2:04 | 8.6 |
| 7 | 16 | 16 | 1:28:56 | 14 | 39:05 | 2.3 |
| 8 | 24 | 24 | 34:46 | 6 | 4:36 | 7.6 |
| 9 | 32 | 32 | 45:35 | 8 | 7:02 | 6.5 |
| 10 | 48 | 48 | 53:17 | 12 | 9:22 | 5.7 |

The above and related processes, and other necessary instructions, may be encoded as executable instructions on one or more non-transitory computer readable media, such as hard disc drives or optical discs, and executed using one or more computer processors, in concert with an operating system or other suitable measures.

In a hardware implementation, the invention may comprise a dedicated processor or processing portions of a system on chip (SOC), portions of a field programmable gate array (FPGA), or other such suitable measures, executing processor instructions for performing the functions described herein or emulating certain structures defined herein. Suitable circuits using, for example, discrete logic gates such as in an Application Specific Integrated Circuit (ASIC), Programmable Logic Array (PLA), or Field Programmable Gate Arrays (FPGA) may also be developed to perform these functions.

As an example, FIG. 6 is a block diagram illustrating an exemplary computer system for programmatic and/or hardware implementation of various aspects of the disclosed system and method. For instance, it may serve as a host for such hardware modules, and/or as a host for executing software modules such as EDA tools/simulations/emulation/firmware, in accordance with various configurations of the disclosed system and method.

A computer system 700 contains: a processor unit 702, a main memory 704, an interconnect bus 706, a memory controller 708 that is coupled to a memory device 7082, peripheral device(s) 710, input control device(s) 712, portable storage medium drive(s) 714, a graphics subsystem 716, and an output display 718. Processor unit 702 may include a single microprocessor or a plurality of microprocessors for configuring computer system 700 as a multi-processor system. Main memory 704 stores, in part, instructions and data to be executed by processor unit 702. Main memory 704 preferably includes banks of dynamic random access memory (DRAM) as well as high-speed cache memory.

For the purpose of simplicity, all the components of computer system 700 are connected via interconnect bus 706. However, computer system 700 may be connected through one or more data transport means. For example, processor unit 702 and main memory 704 may be connected via a local microprocessor bus; and memory controller 708, peripheral device(s) 710, portable storage medium drive(s) 714, and graphics subsystem 716 may be connected via one or more input/output (I/O) buses. Memory device 7082 may be implemented as a nonvolatile semiconductor memory for storing data and instructions to be used by processor unit 702. Memory device 7082 may store the software to load it to the main memory 704 or may be represented in an EDA tool simulation by suitable classes (incorporating data structures and functions operable upon the data structures) or the like as would be known to one of skill in the art.

Portable storage medium drive 714 operates to input and output data and code to and from the computer system 700. In one configuration, the software is stored on such a portable medium, and is input to computer system 700 via portable storage medium drive 714. Peripheral device(s) 710 may include any type of computer support device such as an input/output (I/O) interface, to add additional functionality to computer system 700. For example, peripheral device(s) 710 may include a network interface card, to interface computer system 700 to a network. Peripheral device(s) may also include a memory controller and nonvolatile memory.

Input control device(s) 712 provide a portion of the user interface for a computer system 700 user. Input control device(s) 712 may include an alphanumeric keypad for inputting alphanumeric and other key information; and a cursor control device such as a mouse, a trackpad or stylus; or cursor direction keys.

In order to display textual and graphical information, computer system 700 contains graphics subsystem 714 and output display(s) 718. Output display 718 may include a cathode ray tube (CRT) display, liquid crystal display (LCD), plasma, or active matrix organic light emitting diode (AMOLED) display. Graphics subsystem 716 receives textual and graphical information, and processes the information for output to display 718.

The descriptions above are intended to illustrate possible implementations of the disclosed system and method, and are not restrictive. While this disclosure has been made in connection with specific forms and embodiments thereof, it will be appreciated that various modifications other than those discussed above may be resorted to without departing from the spirit or scope of the disclosed system and method. Such variations, modifications, and alternatives will become apparent to the skilled artisan upon a review of the disclosure. For example, functionally equivalent elements or method steps may be substituted for those specifically shown and described, and certain features may be used independently of other features, and all or some of the above embodiments may be selectively combined with each other, and in certain cases, particular locations of elements or sequence of method steps may be reversed or interposed, all without departing from the spirit or scope of the disclosed system and method as defined in the appended claims. The scope should therefore be determined with reference to the description above and the appended claims, along with their full range of equivalents.

What is claimed is:

1. A method of extracting a minimal set of extracted timing models (ETMs) for a plurality of timing views from a circuit block of a circuit design operable in a plurality of analysis modes under a plurality of corners, the circuit design representing an electronic circuit to be fabricated, the method comprising:

defining the plurality of timing views, each timing view representing a combination of at least one of a plurality of analysis modes with at least one of a plurality of corners, each corner defining a predetermined set of operating conditions for the electronic circuit;

executing a processor to selectively map, based at least on a compatibility test, the plurality of timing views to a plurality of compatibility groups, each of the plurality of timing views being mapped to at least one compatibility group; and for each compatibility group, executing a processor to extract an extracted timing model (ETM) of the circuit block for timing views mapped to said compatibility group, wherein the compatibility test includes a comparison of the corners of at least a first and second timing view, wherein the compatibility test determines whether a new timing view is compatible with another timing view mapped in an existing compatibility group, wherein the circuit design is altered to correct at least one timing violation detected by a static timing analysis of at least one ETM modeling the circuit block, and wherein the electronic circuit is fabricated according to the altered circuit design.

2. The method of claim 1, wherein the selective mapping includes, for each of the plurality of timing views:

determining whether the timing view is compatible with an existing compatibility group according to the compatibility test, if the timing view is determined to be compatible with an existing compatibility group, mapping the timing view to the existing compatibility group, and if the timing view is determined not to be compatible with any existing compatibility group, generating a new compatibility group using the timing view.

3. The method of claim 2, wherein a compatibility group is generated using a timing view by defining the timing view as a master view of the compatibility group and adding the timing view to a list of compatible views of the compatibility group, and wherein a timing view is mapped to a compatibility group by adding the timing view to the list of compatible views of the compatibility group.

4. The method of claim 1, wherein the compatibility test determines that a first timing view is compatible with a second timing view if each operating condition of the corner of the first timing view is the same as a corresponding operating condition of the corner of the second timing view, and wherein the compatibility test determines that a timing view is compatible with a compatibility group if said timing view is compatible with a timing view already mapped to the compatibility group.

5. The method of claim 4, wherein the operating conditions of the corner of each view include a voltage value.

6. The method of claim 4, wherein the operating conditions of the corner of each view include a temperature value.

7. The method of claim 4, wherein the operating conditions of the corner of each view include an operating process.

8. The method of claim 4, wherein the operating conditions of the corner of each view include a power/ground state.

9. The method of claim 1, wherein the extraction of the ETM includes a path enumeration of the circuit block.

10. The method of claim 1, wherein the extraction of the ETM for the compatibility group includes merging a plurality of ETM arcs, each of the plurality of ETM arcs associated with a timing view mapped to the compatibility group, each of the plurality of ETM arcs including at least one timing characteristic, the merging of the plurality of ETM arcs including:

for each of the at least one timing characteristic of a first ETM arc, comparing the timing characteristic with a corresponding timing characteristic of a second ETM arc, and if each of the at least one timing characteristic of the first ETM arc matches the corresponding timing characteristic of the second ETM arc within a tolerance threshold, generating a merged ETM arc.

11. A concurrent extracted timing model (ETM) generation system for generating models for a plurality of timing views from a circuit block of a circuit design operable in a plurality of analysis modes under a plurality of corners, the circuit design representing an electronic circuit to be fabricated, the system comprising:

a view definition analyzer configured to:
define a plurality of timing views, of timing views, each timing view representing a combination of at least one of a plurality of analysis modes with at least one of a plurality of corners, each corner defining a predetermined set of operating conditions for the electronic circuit, and selectively map, based at least on a compatibility test, the plurality of timing views to a plurality of compatibility groups, each of the plurality of timing views being mapped to at least one compatibility group; and an ETM generator configured to extract an ETM for each compatibility group, the ETM modeling the circuit block for timing views mapped to said compatibility group, wherein the compatibility test includes a comparison of the corners of at least a first and second timing view, wherein the compatibility test determines whether a new timing view is compatible with another timing view mapped in an existing compatibility group, wherein the circuit design is altered to correct at least one timing violation detected by a static timing analysis of at least one ETM modeling the circuit block, and wherein the electronic circuit is fabricated according to the altered circuit design.

12. The concurrent ETM generation system of claim 11, wherein the ETM generator includes:

a concurrent path enumerator (CPE) configured to enumerate a plurality of timing paths from a block of a circuit design, each enumerated path being a worst-case timing path for an interface path in the circuit block, a concurrent path characterizer (CPC) configured to compute timing characteristics of a timing path and to join one or more characterized timing paths into an ETM arc, the timing characteristics of a timing path including an input slew and an output load, the ETM arc including an output delay value computed from input slews and output loads of the joined paths,
a concurrent ETM-arcs manager (CEAM) configured to merge a plurality of ETM arcs into a merged ETM arc, each plurality of compatible ETM arcs corresponding to a subset of all timing views mapped to a compatibility group, and
a model writer configured to generate an ETM from each merged ETM arc.

13. The concurrent ETM generation system of claim 11, wherein the extraction of the ETM for the compatibility group includes merging a plurality of ETM arcs, each of the plurality of ETM arcs associated with a timing view mapped to the compatibility group, each of the plurality of ETM arcs including at least one timing characteristic, the merging of the plurality of ETM arcs including:
for each of the at least one timing characteristic of a first ETM arc, comparing the timing characteristic with a corresponding timing characteristic of a second ETM arc, and
if each of the at least one timing characteristic of the first ETM arc matches the corresponding timing characteristic of the second ETM arc within a tolerance threshold, generating a merged ETM arc.

14. The concurrent ETM generation system of claim 11, wherein the selective mapping includes, for each of the plurality of timing views:
determining whether the timing view is compatible with an existing compatibility group according to the compatibility test,
if the timing view is determined to be compatible with an existing compatibility group, mapping the timing view to the existing compatibility group, and
if the timing view is determined not to be compatible with any existing compatibility group, generating a new compatibility group using the timing view.

15. The concurrent ETM generation system of claim 14, wherein the compatibility test determines that a first timing view is compatible with a second timing view if each operating condition of the corner of the first timing view is the same as a corresponding operating condition of the corner of the second timing view, and
wherein the compatibility test determines that a timing view is compatible with a compatibility group if said timing view is compatible with a timing view already mapped to the compatibility group.

16. A method of optimizing a static timing analysis (STA) process of a circuit design operable in a plurality of analysis modes under a plurality of corners, the circuit design representing an electronic circuit to be fabricated, the method comprising:
defining the plurality of timing views, each timing view representing a combination of at least one of a plurality of analysis modes with at least one of a plurality of corners, each corner defining a predetermined set of operating conditions for the electronic circuit,
executing a processor to selectively map, based at least on a compatibility test, the plurality of timing views to a plurality of compatibility groups, each of the plurality of timing views being mapped to at least one compatibility group;
for each compatibility group, executing a processor to extract an extracted timing model (ETM) of the circuit block for timing views mapped to said compatibility group; and
executing a processor to perform at least one static timing analysis on the circuit design for all timing views mapped to a selected compatibility group by instantiating the ETM of the selected compatibility group in place of the circuit block in an analyzed circuit model,
wherein the compatibility test includes a comparison of the corners of at least a first and second timing view,
wherein the compatibility test determines whether a new timing view is compatible with another timing view mapped in an existing compatibility group,
wherein the circuit design is altered to correct at least one timing violation detected by the static timing analysis, and
wherein the electronic circuit is fabricated according to the altered circuit design.

17. The method of claim 16, wherein the extraction of the ETM for the compatibility group includes merging a plurality of ETM arcs, each of the plurality of ETM arcs associated with a timing view mapped to the compatibility group, each of the plurality of ETM arcs including at least one timing characteristic, the merging of the plurality of ETM arcs including:
for each of the at least one timing characteristic of a first ETM arc, comparing the timing characteristic with a corresponding timing characteristic of a second ETM arc, and
if each of the at least one timing characteristic of the first ETM arc matches the corresponding timing characteristic of the second ETM arc within a tolerance threshold, generating a merged ETM arc.

18. The method of claim 17, wherein the selective mapping includes, for each of the plurality of timing views:
determining whether the timing view is compatible with an existing compatibility group according to the compatibility test,
if the timing view is determined to be compatible with an existing compatibility group, mapping the timing view to the existing compatibility group, and
if the timing view is determined not to be compatible with any existing compatibility group, generating a new compatibility group using the timing view.

19. The method of claim 18,
wherein a compatibility group is generated using a timing view by defining the timing view as a master view of the compatibility group and adding the timing view to a list of compatible views of the compatibility group, and
wherein a timing view is mapped to a compatibility group by adding the timing view to the list of compatible views of the compatibility group.

20. The method of claim 19, wherein the operating conditions of the corner of each view include a voltage value, a temperature value, and an operating process.

* * * * *